United States Patent [19]
Mitani et al.

[11] Patent Number: 5,628,629
[45] Date of Patent: May 13, 1997

[54] INDUSTRIAL FURNACE AND A BURNER FOR CONDUCTING REGENERATIVE COMBUSTION AND A COMBUSTION METHOD THEREFOR

[75] Inventors: Kazuhisa Mitani; Tomohiko Nishiyama, both of Toyota; Ryoichi Tanaka, Tokyo-to, all of Japan

[73] Assignees: Toyota Jidosha Kabushiki Kaisha, Toyota; Nippon Furnace Kogyo Kaisha, Ltd., Yokohama, both of Japan

[21] Appl. No.: 540,832

[22] Filed: Oct. 11, 1995

[30] Foreign Application Priority Data

| Oct. 14, 1994 | [JP] | Japan | 6-249356 |
| Oct. 14, 1994 | [JP] | Japan | 6-249357 |
| Sep. 11, 1995 | [JP] | Japan | 7-232136 |
| Sep. 11, 1995 | [JP] | Japan | 7-232143 |

[51] Int. Cl.[6] ................................. F23C 5/08
[52] U.S. Cl. ............... 432/180; 432/181; 165/4
[58] Field of Search ............... 432/28, 39, 180, 432/181; 431/11, 215; 126/91 A; 165/4, 9, 3

[56] References Cited

U.S. PATENT DOCUMENTS

| 5,275,556 | 1/1994 | Hirose | 432/180 |
| 5,460,519 | 10/1995 | Hirose | 432/181 |

FOREIGN PATENT DOCUMENTS

| 5-256423 | 10/1993 | Japan . |
| 6-011121 | 1/1994 | Japan . |
| 6-129631 | 5/1994 | Japan . |
| 6-221545 | 8/1994 | Japan . |

*Primary Examiner*—Noah P. Kamen
*Attorney, Agent, or Firm*—Cushman, Darby & Cushman IP Group of Pillsbury Madison & Sutro LLP

[57] ABSTRACT

An industrial furnace and a burner for regenerative combustion includes a heat storage member, a switching mechanism disposed on one end of the heat storage member, and a burner tile disposed on the opposite end of the heat storage member. The burner tile has a protruding portion extending ahead an air supply and gas exhaust surface. The switching mechanism has a stationary disk and a rotatable disk which slidably contacts the stationary disk. A speed of supply air to the furnace is in operation equal to or higher than a speed of exhaust air therefrom.

80 Claims, 19 Drawing Sheets

F I G. 1
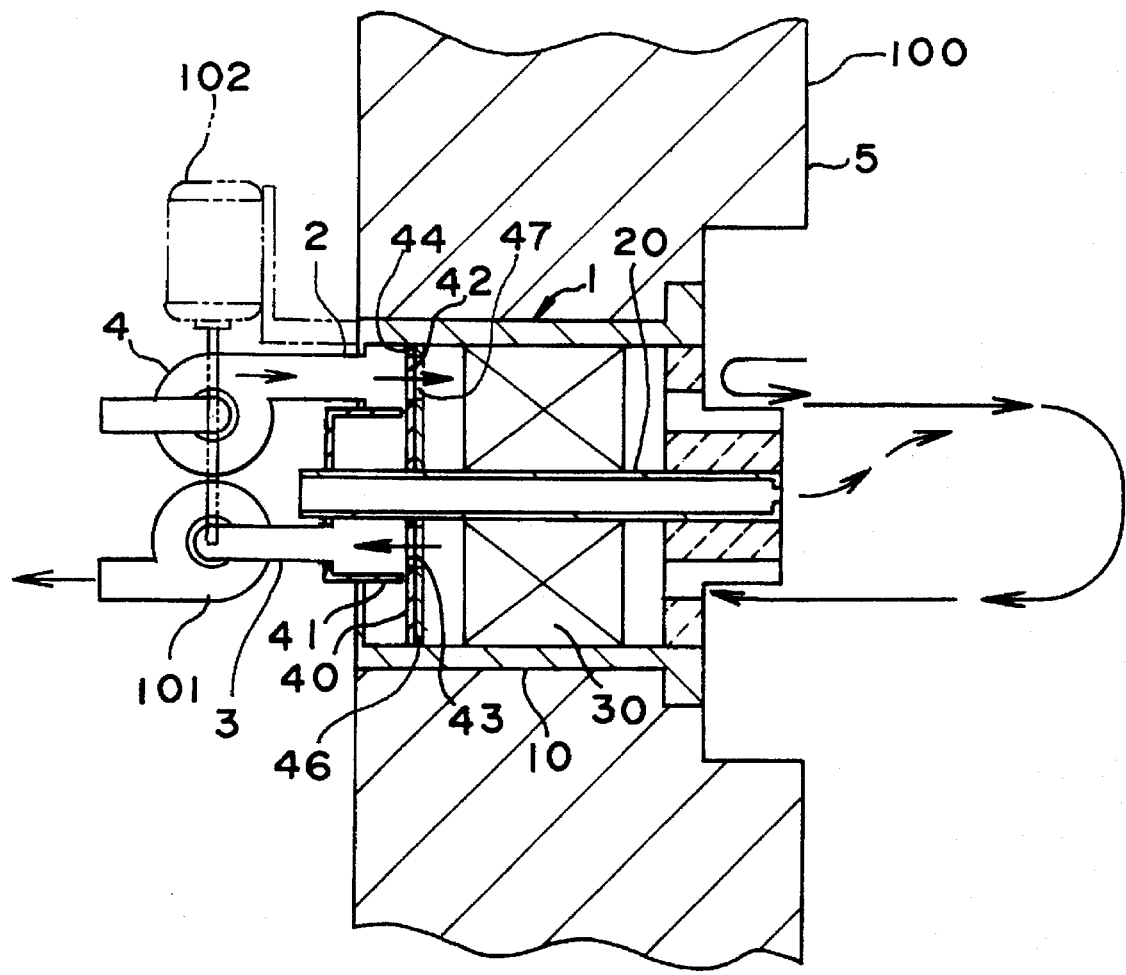

INDUSTRIAL FURNACE AND A BURNER FOR CONDUCTING REGENERATIVE COMBUSTION AND A COMBUSTION METHOD THEREFOR

BACKGROUND OF THE INVENTION

1. Field of the Invention

The present invention relates to an industrial furnace, a burner thereof and a combustion method therefor for conducting regenerative combustion. In regenerative combustion, heat from exhaust gas is stored in a heat storage member by causing exhaust gas to flow through the heat storage member. Gas flow through the heat storage member is then alternately switched between supply air flow and exhaust gas flow, whereby supply air flowing through the heat storage member, in which the heat from the exhaust gas is stored, is heated by the heat storage member.

2. Description of Related Art

Japanese Patent Publication No. HEI 5-246423 discloses a pair of burners for conducting regenerative combustion which are alternately switched in operation. A heat storage member is mounted in a main body of each burner, and a switching valve is disposed outside the main body of each burner in communication with the main body of each burner.

As a result, the burner has a problem that piping for connecting the switching valve and the main body of the burner needs to be provided. This makes the combustion apparatus large. Therefore, a long purging time period at every switching time results because the volume in the piping to be purged is large.

To address such problems, one of the applicants of the present application proposed a burner for conducting regenerative combustion wherein a switching mechanism is mounted within a main body of the burner. In the burner, a heat storage member is sectioned into a plurality of circumferential sections by partitioning plates extending in an axial direction of the burner. A rotatable disk slidably contacts end surfaces of the partitioning plates so that supply air flow and exhaust gas flow through the sections of the heat storage member are switched in accordance with rotation of the rotatable disk.

Further, with the proposed burner, as well as the burner of Japanese Patent Publication No. HEI 5-256423, a fuel release surface and an air supply and gas exhaust surface, where a plurality gas flow holes for causing supply air and exhaust gas to pass therethrough are open, are positioned in the same plane perpendicular to an axis of the burner.

However, the proposed burner and the burner of HEI 5-256423 still have the following problems:

First, because the same gas flow hole is used as a supply air flow hole and as an exhaust gas flow hole by switching a gas flow between supply and exhaust, a cross-sectional area for allowing supply air to pass therethrough and a cross-sectional area for allowing exhaust gas to pass therethrough are equal with each other. As a result, it is difficult to raise a supply air flow speed by throttling the cross-sectional area of the supply air flow hole, because if throttled, the cross-sectional area of the exhaust gas flow hole is necessarily also throttled, which raises the internal pressure of the furnace to an intolerable level. Thus, the supply air flow speed cannot be raised. As a result, the amount of burnt gas drawn and involved by the supply air flow and recirculated in the furnace is small, making it difficult to suppress generation of NOx. Further, the amount of fuel drawn by the supply air flow is also small, which degrades combustion and shortens the length of a combustion zone in a direction from the burner toward an opposite end of the furnace.

Second, supply air is likely to leak through a clearance between the end surfaces of the partitioning plates and the rotatable disk, shortening the path to the exhaust gas. As a result, the supply air flow speed is further decreased, which strengthens the above problems. Further, the shortened path will cause a deficit in available supply air, thereby causing imperfect combustion and increasing CO in the exhaust gas.

Third, when combustion is conducted using the conventional burner having the fuel release surface and the air supply and gas exhaust surface in the same plane, amount of CO (carbon monoxide) and NOx (nitrogen oxides) in the exhaust gas is large, so that some treatment for decreasing the amount of CO and NOx is often needed. Further, the combustion zone produced by the conventional burner is usually short.

SUMMARY OF THE INVENTION

An object of the present invention is to provide an industrial furnace and a burner for conducting regenerative combustion and a combustion method therefor which can advantageously raise a speed of supply air for combustion.

Another object of the present invention is to provide an industrial furnace and a burner for conducting regenerative combustion and a combustion method therefor which can decrease CO and NOx generated during combustion.

The above objects are achieved by the following industrial furnace, a burner, and a method according to the present invention.

(a) An industrial furnace for conducting regenerative combustion comprising:

a heat storage member including a plurality of sections separated from each other along a circumferential direction of the heat storage member;

a burner tile disposed on one side of the heat storage member in an axial direction of the heat storage member, the burner tile including a nozzle insertion hole where a fuel injection nozzle is inserted, a plurality of gas flow holes switched between a hole for letting supply air pass therethrough and a hole for letting exhaust gas pass therethrough, and an air supply and gas exhaust surface where the gas flow holes are open; and a switching mechanism disposed on the other side of the heat storage member from the burner tile, the switching mechanism including a stationary disk, a rotatable disk slidably contacting the stationary disk, and a partitioning wall separating a supply air flow area and an exhaust gas flow area from each other, the stationary disk including a plurality of apertures, the rotatable disk including a plurality of openings for gas flow which are opened and closed in accordance with rotation of the rotatable disk, the openings including at least one supply air flow opening communicating with the supply air flow area located on one side of the partitioning wall and at least one exhaust gas flow opening communicating with the exhaust gas flow area located on another side of the partitioning wall from the supply flow area, and wherein the heat storage member, the burner tile, and the switching mechanism are independent from each other, and at least one of the heat storage member, the burner tile, and the switching mechanism is fixed to a wall of the industrial furnace as at least one of furnace component members.

(b) An industrial furnace stated in (a) above, wherein shapes and positions of the openings formed in the rotatable disk and shapes and positions of the apertures formed in the stationary disk are determined relative to each other such that a total cross-sectional area of at least one gas flow hole formed in the burner tile covered by the exhaust gas flow opening formed in the rotatable disk is equal to or greater than a total cross-sectional area of at least one gas flow hole formed in the burner tile covered by the supply air flow opening formed in the rotatable disk.

(c) An industrial furnace for conducting regenerative combustion comprising:

a burner tile including:

an air supply and gas exhaust surface including a plurality of gas flow holes for selectively letting supply air and exhaust gas pass therethrough;

a protruding portion extending from the air supply and gas exhaust surface; and a fuel release surface for releasing injected fuel, the fuel release surface extending from an inside surface to a front end of the protruding portion, and wherein the burner tile is fixed to a wall of the industrial furnace to constitute at least one of furnace component members.

(d) A burner for conducting regenerative combustion comprising:

a heat storage member including a plurality of sections separated from each other in a circumferential direction of the heat storage member;

a burner tile disposed on one side of the heat storage member in an axial direction of the heat storage member, the burner tile including a nozzle insertion hole where a fuel injection nozzle is inserted, a plurality of gas flow holes switchable between letting supply air pass therethrough and letting exhaust gas pass therethrough, and an air supply and gas exhaust surface where the gas flow holes are provided; and a switching mechanism disposed on the other side of the heat storage member in the axial direction of the heat storage member, the switching mechanism including a stationary disk, a rotatable disk slidably contacting the stationary disk, and a partitioning wall separating a supply air flow area and an exhaust gas flow area from each other, the stationary disk including a plurality of apertures, the rotatable disk including a plurality of openings for gas flow which are opened and closed in accordance with rotation of the rotatable disk, the openings including at least one supply air flow opening communicating with the supply air flow area located on one side of the partitioning wall and at least one exhaust gas flow opening communicating with the exhaust gas flow area located on the other side of the partitioning wall.

(e) A burner as stated in (d), wherein shapes and positions of the openings formed in the rotatable disk and shapes and positions of the apertures formed in the stationary disk are determined relative to each other such that a total cross-sectional area of at least one gas flow hole formed in the burner tile covered by the exhaust gas flow opening formed in the rotatable disk is equal to or greater than a total cross-sectional area of at least one gas flow hole formed in the burner tile covered by the supply air flow opening formed in the rotatable disk.

(f) A burner for conducting regenerative combustion, comprising:

a burner tile including:

an air supply and gas exhaust surface including a plurality of gas flow holes for switchably letting supply air and exhaust gas pass therethrough;

a protruding portion extending from the air supply and gas exhaust surface; and a fuel release surface for releasing injected fuel, the fuel release surface extending from an inside surface to a front end of the protruding portion.

(g) A combustion method for an industrial furnace comprising the steps of:

supplying supply air into a furnace through at least one hole provided in an air supply and gas exhaust surface acting as a supply air flow hole among a plurality of gas flow holes for selectively letting supply air and exhaust gas pass therethrough;

mixing fuel and the supply air with each other ahead the air supply and gas exhaust surface and burning the mixture of the fuel and the supply air; and exhausting burnt gas from the furnace through at least one hole acting as an exhaust gas flow hole among the plurality of gas flow holes, the at least one hole acting as an exhaust gas flow hole having a total cross-sectional area equal to or greater than a total cross-sectional area of the at least one hole acting as a supply air flow hole.

(h) A combustion method for an industrial furnace comprising the steps of:

supplying supply air into a furnace through at least one hole acting as a supply air flow hole among a plurality of gas flow holes for selectively letting supply air and exhaust gas pass therethrough;

letting the supply air entrain a portion of burnt gas while the supply air is flowing along a side surface of a protruding portion extending from the air supply and gas exhaust surface towards a front end of the protruding portion, thereby recirculating the portion of burnt gas in the furnace; and mixing the supply air and the recirculated portion of burnt gas with fuel released from a fuel release surface and flowing a mixture of the supply air, the recirculated portion of burnt gas, and the fuel ahead of the front end of the protruding portion to form a combustion zone extending toward an interior of the furnace where the mixture is burned.

(i) A combustion method stated in (h), further comprising the step of:

exhausting burnt gas from the furnace through at least one hole acting as an exhaust gas flow hole among the plurality of gas flow holes, wherein a shortened path of the fuel released from the fuel release surface directly to the at least one hole acting as an exhaust gas flow hole is suppressed by spacing a front end of the fuel release surface from the air supply and gas exhaust surface by a length of the protruding portion.

In the industrial furnace stated in item (a) and the burner stated in item (d), because the switching mechanism uses the rotatable disk and the stationary disk which slidably contact each other, a contact area between the rotatable disk and the stationary disk is relatively large compared with a contact area between an end surface of a dividing wall and a rotatable disk of the conventional switching mechanism. Therefore, a seal between the rotational disk and the stationary disk is high. As a result, leakage of supply air from the supply air flow opening to the exhaust gas flow opening through a very small clearance formed between contact surfaces of the rotational disk and the stationary disk is suppressed. Furthermore, a ratio of a portion of the supply air used for combustion to an entire amount of the supply air increases, thereby improving combustion efficiency and increasing supply air pressure and supply air speed into the furnace.

In the industrial furnace stated in item (b), the burner stated in item (e), and combustion method stated in item (g), because the total cross-sectional area of the at least one gas flow hole formed in the burner tile acting as a hole for letting exhaust gas pass therethrough is equal to or greater than the total cross-sectional area of the at least one gas flow hole formed in the burner tile acting as a hole for letting supply air pass therethrough, a speed of the supply air passing through the gas flow hole acting as a hole for letting supply air pass therethrough is increased compared with that of the conventional furnace or burner. Due to this increase in the speed of the supply air, fuel is strongly drawn by and entrained in the supply air, and a portion of burnt gas in the furnace also is strongly drawn by the supply air to strongly recirculate in the furnace. Because the fuel is drawn by the supply air, a shortened path of the fuel to the gas flow hole acting as a hole for letting exhaust gas pass therethrough is suppressed so that imperfect combustion of fuel, accompanied by generation of CO, is suppressed. Further, because the burnt gas in the furnace is drawn by the supply air to strongly recirculate in the furnace, combustion is slackened (so-called an EGR effect) and thus generation of NOx at high temperatures can be suppressed. Further, due to the slack of combustion, the combustion zone is extended toward an opposite end of the furnace and temperature distribution in the combustion zone is made uniform. As a result, the temperature of the combustion zone can be raised to a temperature close to a maximum allowable temperature throughout an entire length of the combustion zone, unlike the conventional combustion zone having a large temperature variance. Due to the raised temperature, average heat flux also is raised and combustion at a high efficiency is possible because a radiation heat transfer is improved. As a result, in a case where the same amount of heat transfer is to be achieved, down-sizing of the furnace, improvement of a space efficiency, and decrease in an initial cost are possible. Further, due to the uniform temperature distribution of the combustion zone, the furnace walls are not locally heated to high temperatures, so that improvement in the furnace life, decrease in maintenance cost, and decrease in initial cost of the furnace are possible. Furthermore, due to the slack of combustion, combustion noise also decreases.

In the industrial furnace stated in item (c), the burner stated in item (f), and combustion methods stated in items (h) and (i), because the fuel release surface is formed in the protruding portion extending ahead from the air supply and gas exhaust surface, fuel released from the fuel release surface is prevented from becoming involved by exhaust gas flowing to the gas flow hole acting as a hole for letting exhaust gas pass therethrough, i.e., from making a shortened path to the gas flow hole. As a result, imperfect combustion of fuel, accompanied by generation of CO can be suppressed. Further, owing to the axial protrusion of the protruding portion, the supply air meets the fuel after the supply air has entrained a portion of burnt gas in the furnace, so that the portion of burnt gas is strongly recirculated in the furnace to slack combustion and to suppress generation of NOx at high temperatures. Further, due to the slack of combustion, a combustion zone, (i.e., a high temperature zone) extends toward an opposite end of the furnace and the temperature distribution of the combustion zone is made uniform. As a result, the temperature of the combustion zone can be raised to a temperature close to an allowable temperature throughout an entire length of the combustion zone, unlike the conventional combustion zone having a large temperature variance. Due to this rise in temperature, average heat flux also is raised and high efficiency combustion is possible because radiation heat transfer is improved. As a result, in a case where the same amount of heat transfer is to be achieved, down-sizing of the furnace, improvement of space efficiency, and decrease in initial cost are made possible. Further, due to the uniformity in temperature distribution of the combustion zone, a furnace wall is protected from being locally heated to a high temperature, so that improvement in furnace life, decrease in maintenance cost, and decrease in initial cost of the furnace are attained. Furthermore, due to the slack of combustion, combustion noise is also decreased.

BRIEF DESCRIPTION OF THE DRAWINGS

These and other objects, features, and advantages of the present invention will become more apparent and will be more readily appreciated from the following detailed description of the preferred embodiments of the present invention when taken in conjunction with the accompanying drawings, wherein:

FIG. 1 is a schematic entire cross-sectional view of an industrial furnace and a burner for regenerative combustion in accordance with a first embodiment of the present invention;

DETAILED DESCRIPTION OF THE PREFERRED EMBODIMENTS

Figure 7:
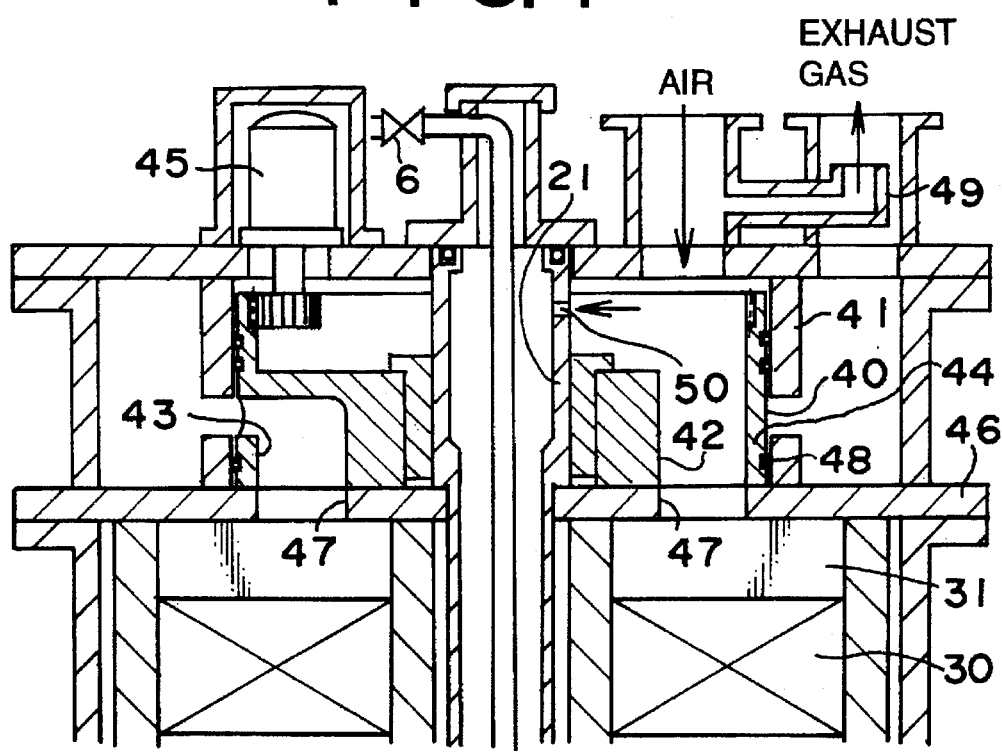
FIG. 7 is a cross-sectional view of a switching mechanism of a portion of an industrial furnace and a burner for regenerative combustion in accordance with a second embodiment of the present invention.
Figure 8:
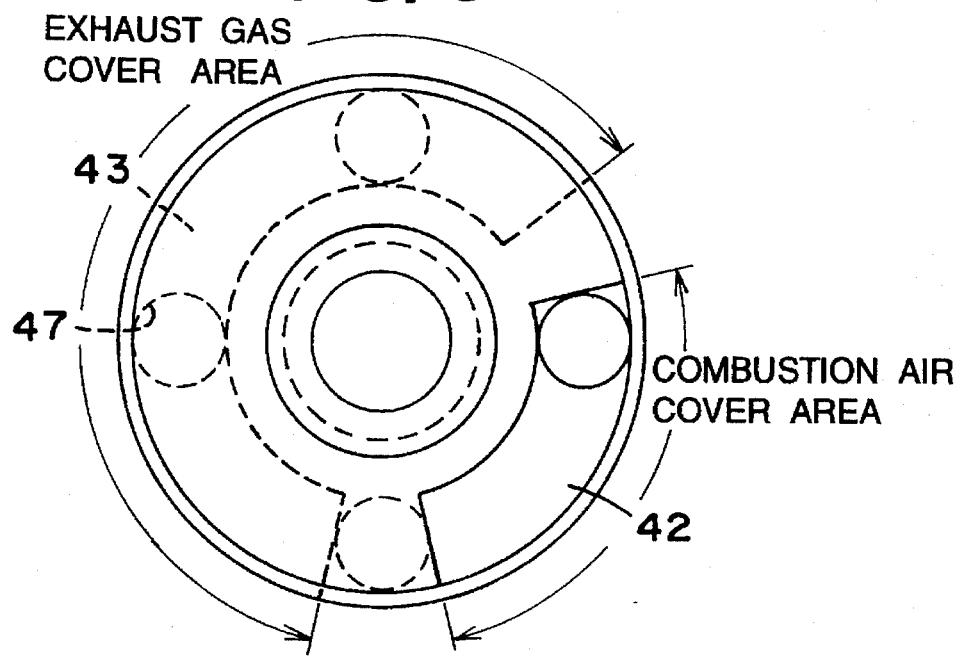
FIG. 8 is a plan view of the switching mechanism of FIG. 7.
Figure 9:
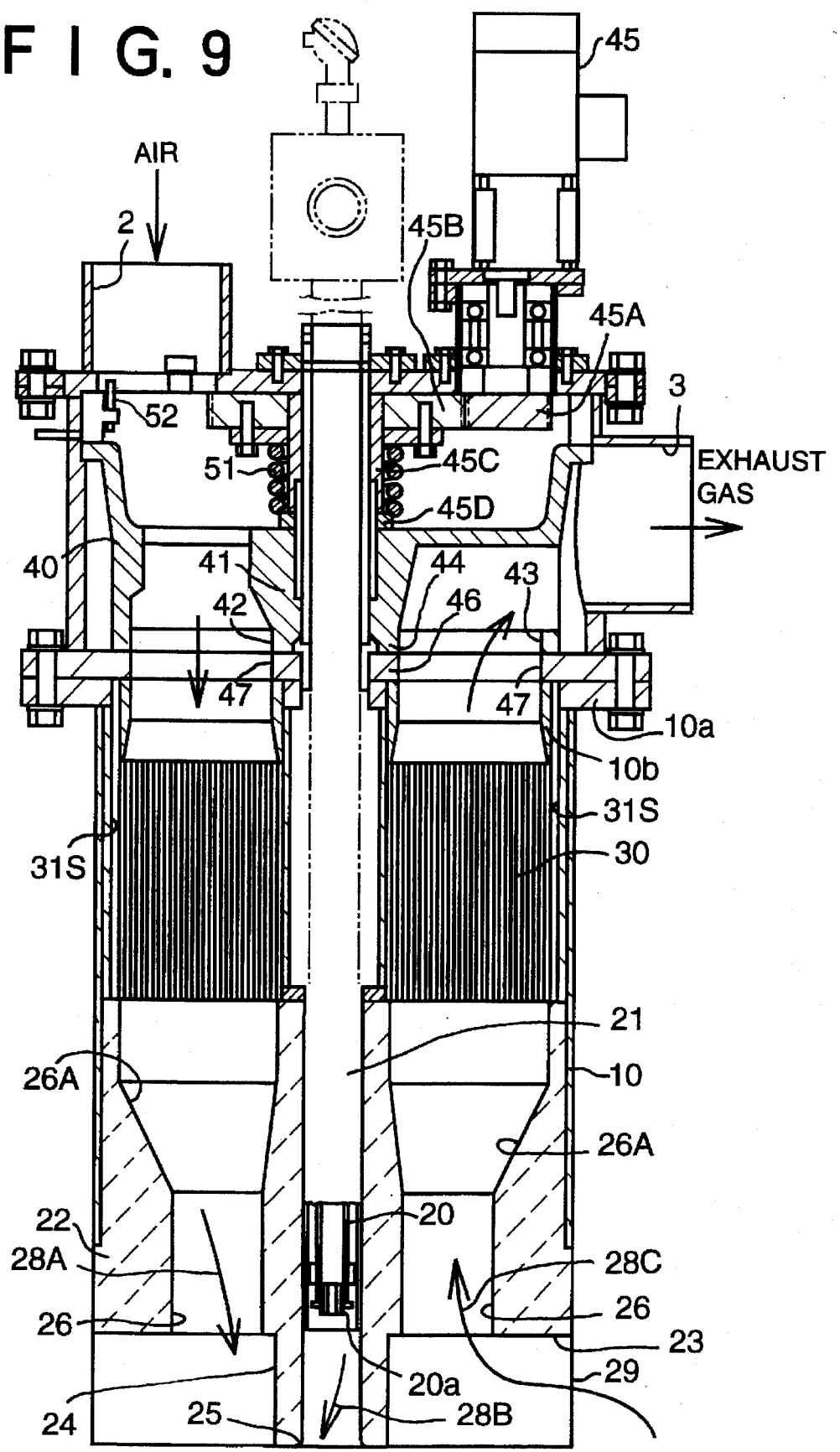
FIG. 9 is a cross-sectional view of a switching mechanism of a portion of an industrial furnace and a burner for regenerative combustion in accordance with a third embodiment of the present invention.
Figure 10:
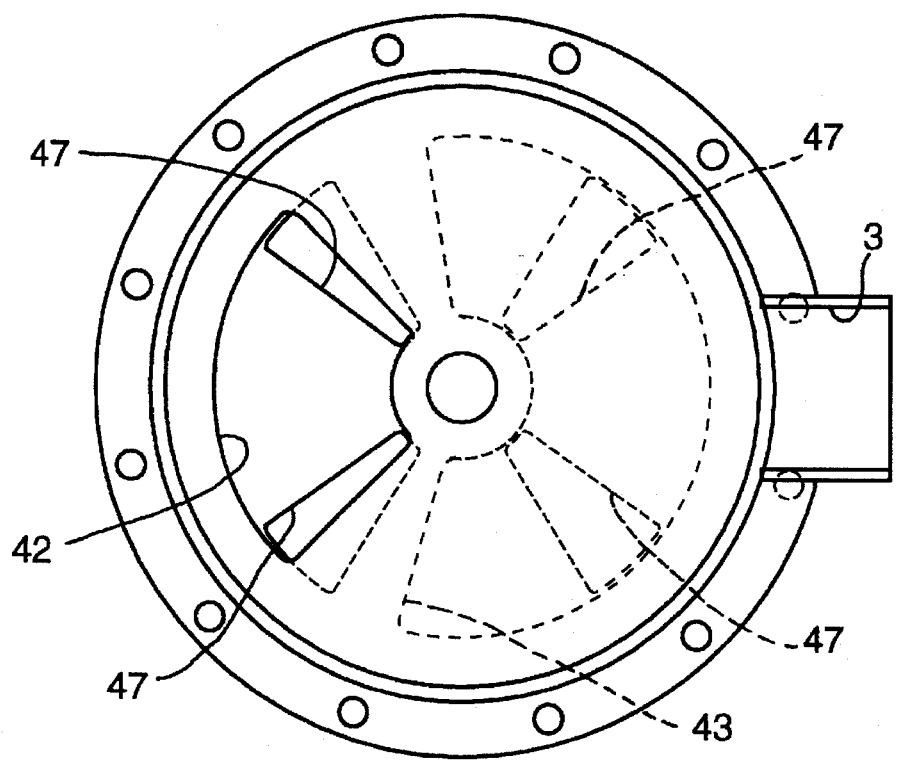
FIG. 10 is a plan view of the switching mechanism of FIG. 9 as viewed from a switching mechanism side.
Figure 11:
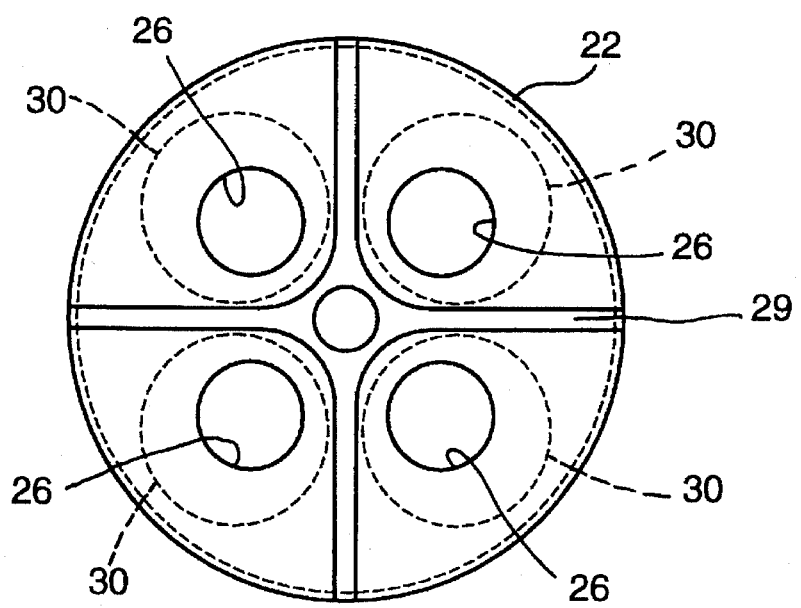
FIG. 11 is a plan view of the switching mechanism of FIG. 9 as viewed from a burner tile side.
Figure 12:
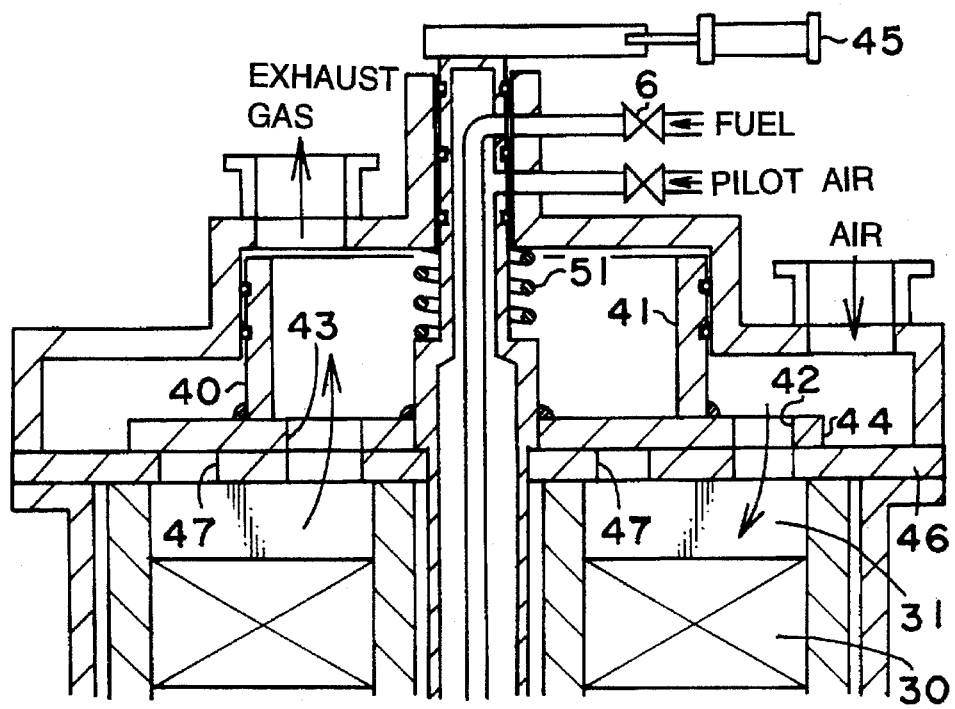
FIG. 12 a cross-sectional view of a switching mechanism of a portion of an industrial furnace and a burner for regenerative combustion in accordance with a fourth embodiment of the present invention.
Figure 13:
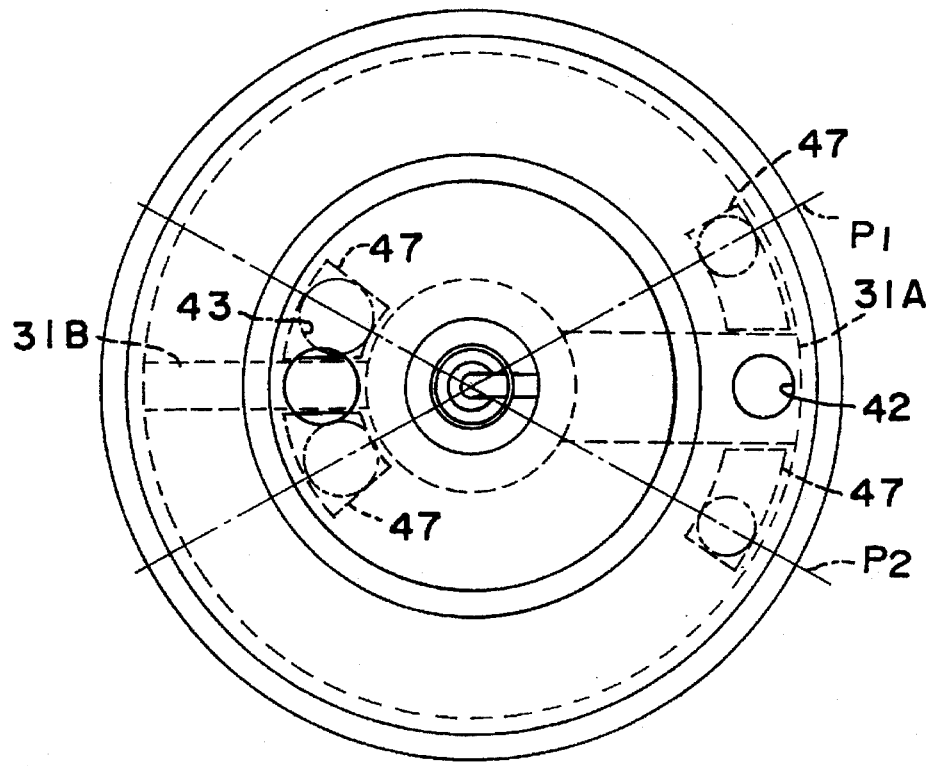
FIG. 13 is a plan view of the switching mechanism of FIG. 12.
Figure 14:
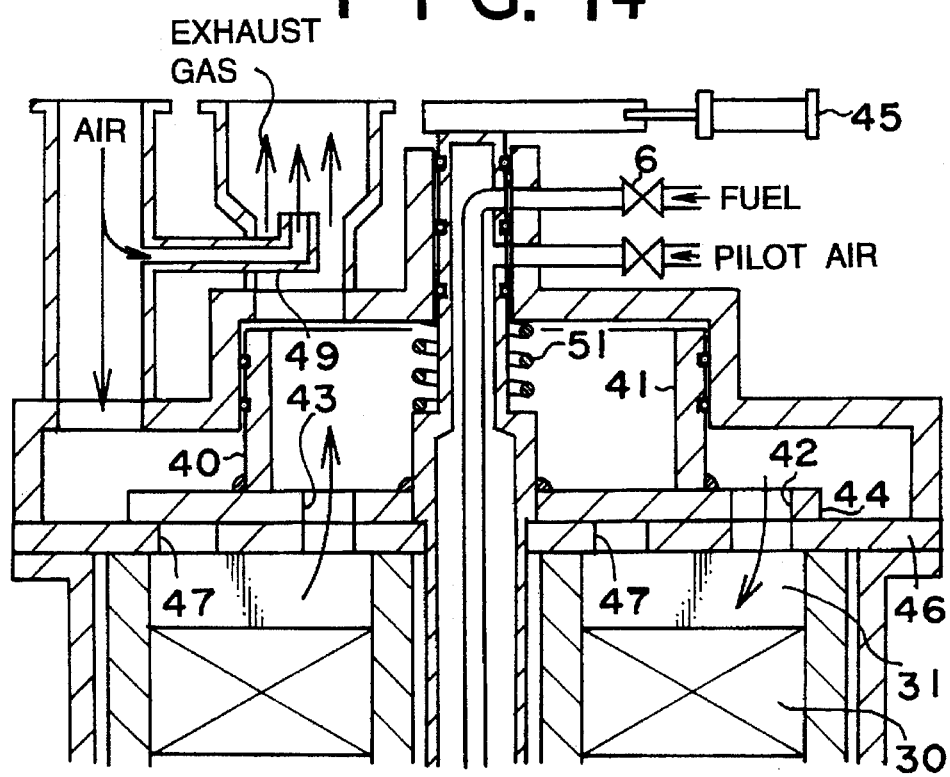
FIG. 14 is a cross-sectional view of a switching mechanism of a portion of an industrial furnace and a burner for regenerative combustion in accordance with a fifth embodiment of the present invention.
Figure 15:
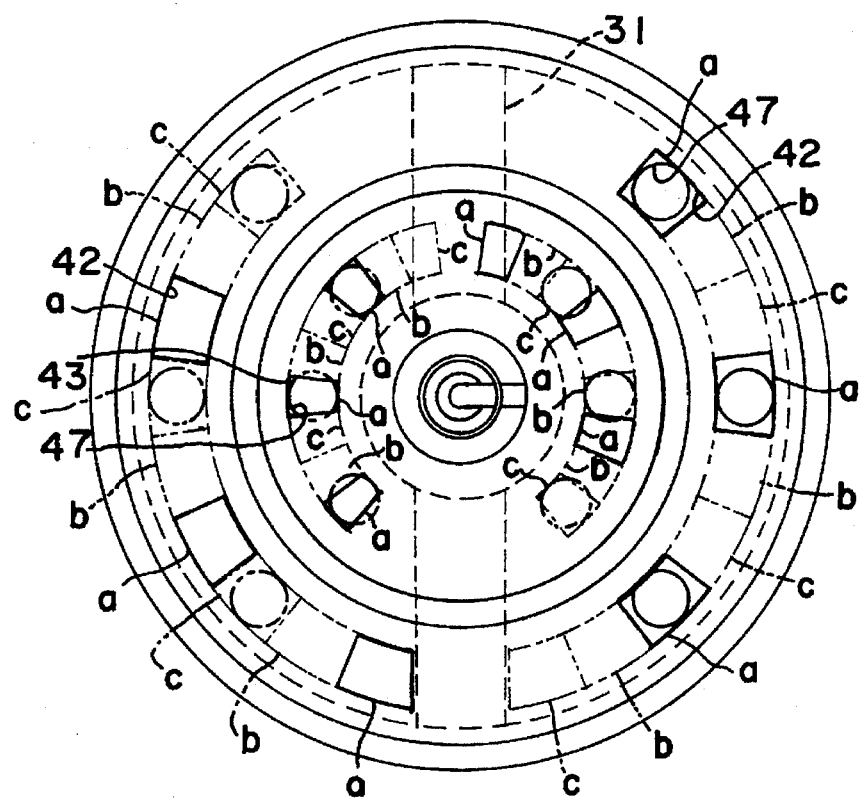
FIG. 15 is a plan view of the switching mechanism of FIG. 14.
Figure 16:
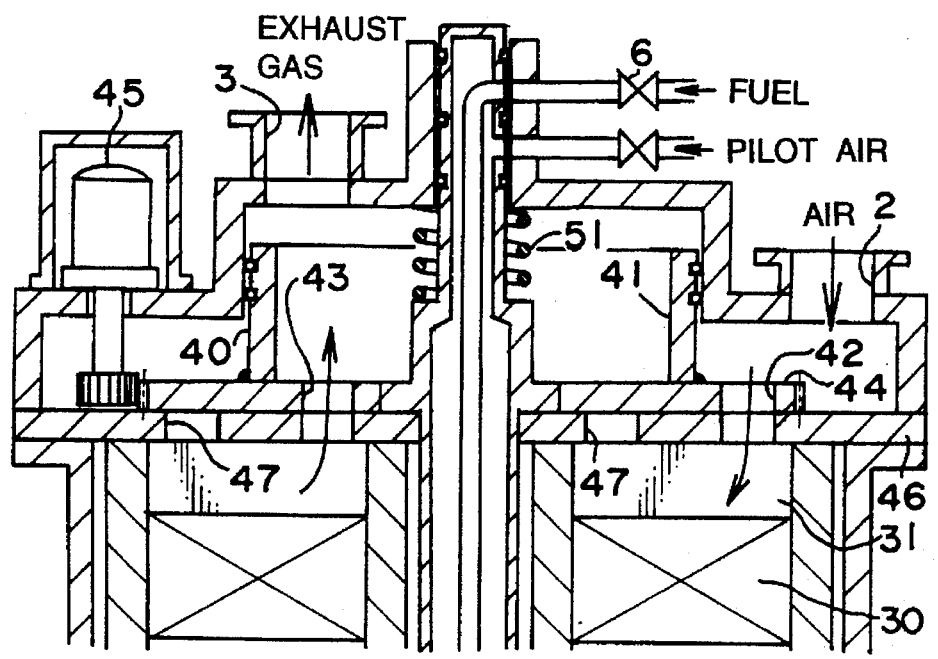
FIG. 16 is a cross-sectional view of a switching mechanism of a portion of an industrial furnace and a burner for regenerative combustion in accordance with a sixth embodiment of the present invention.
Figure 17:
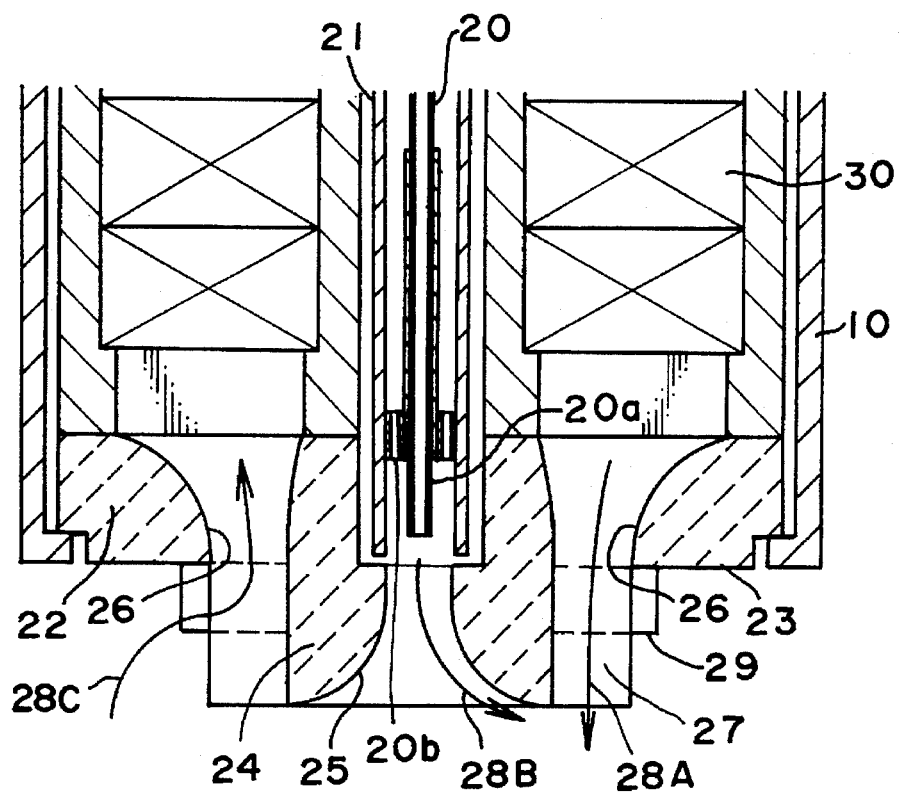
FIG. 17 is a cross-sectional view of a burner tile of the furnace portion and the burner for regenerative combustion in accordance with the sixth embodiment of the present invention.
Figure 18:
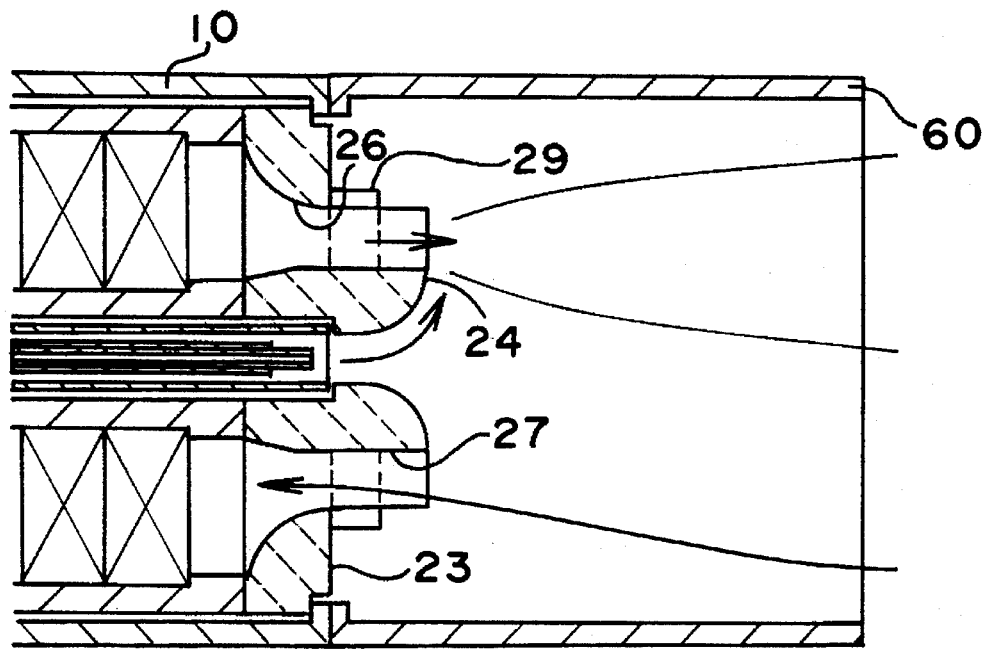
FIG. 18 is a cross-sectional view of a burner tile of a portion of a furnace and a burner for regenerative combustion in accordance with a seventh embodiment of the present invention.
Figure 19:
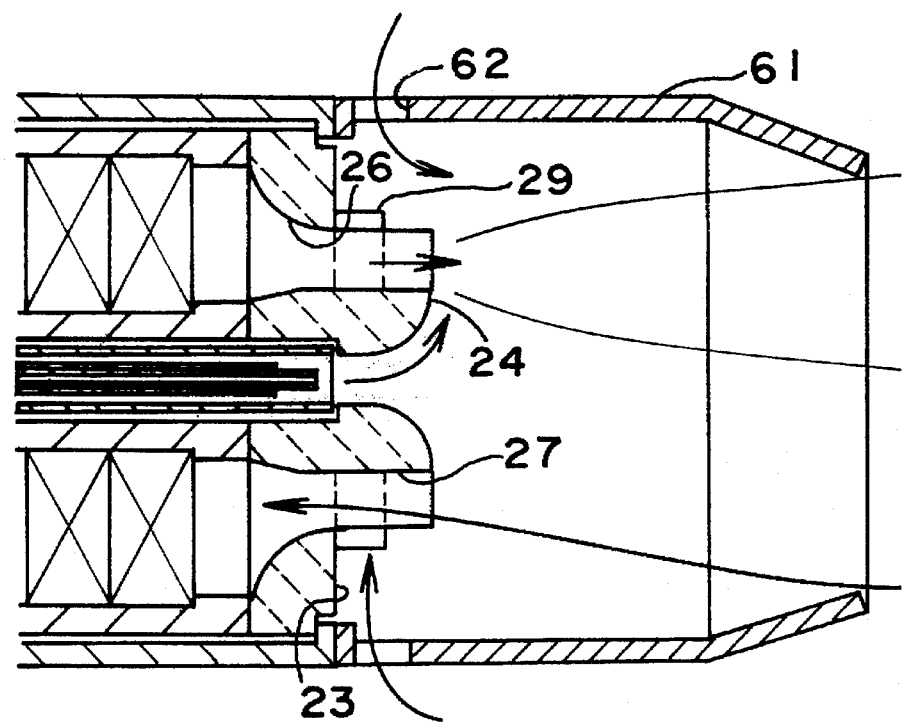
FIG. 19 is a cross-sectional view of a burner tile of a portion of a furnace and a burner for regenerative combustion in accordance with a eighth embodiment of the present invention.
Figure 20:
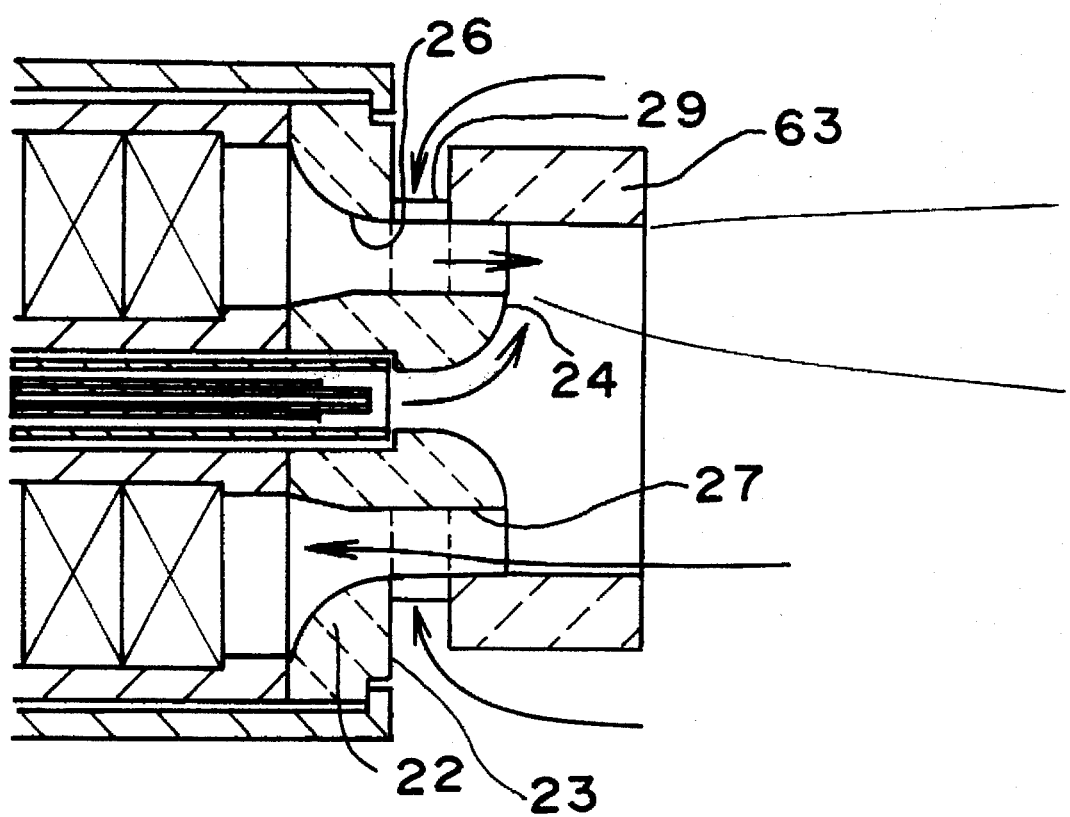
FIG. 20 is a cross-sectional view of a burner tile of a portion of a furnace and a burner for regenerative combustion in accordance with a ninth embodiment of the present invention.
Figure 21:
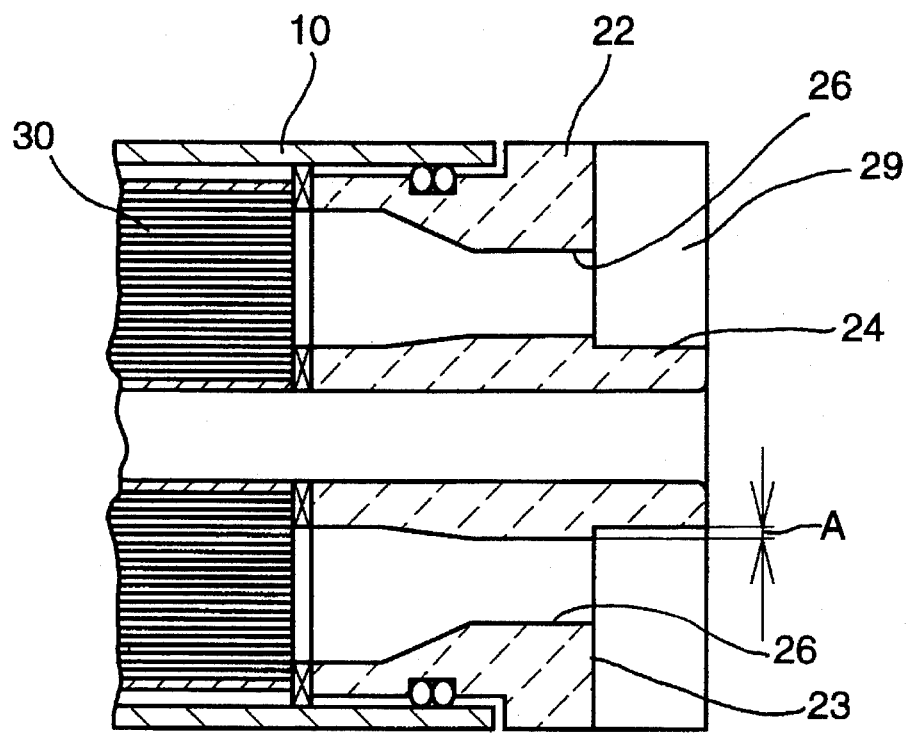
FIG. 21 is a cross-sectional view of a burner tile of a portion of a furnace and a burner for regenerative combustion in accordance with a tenth embodiment of the present invention.
Figure 22:
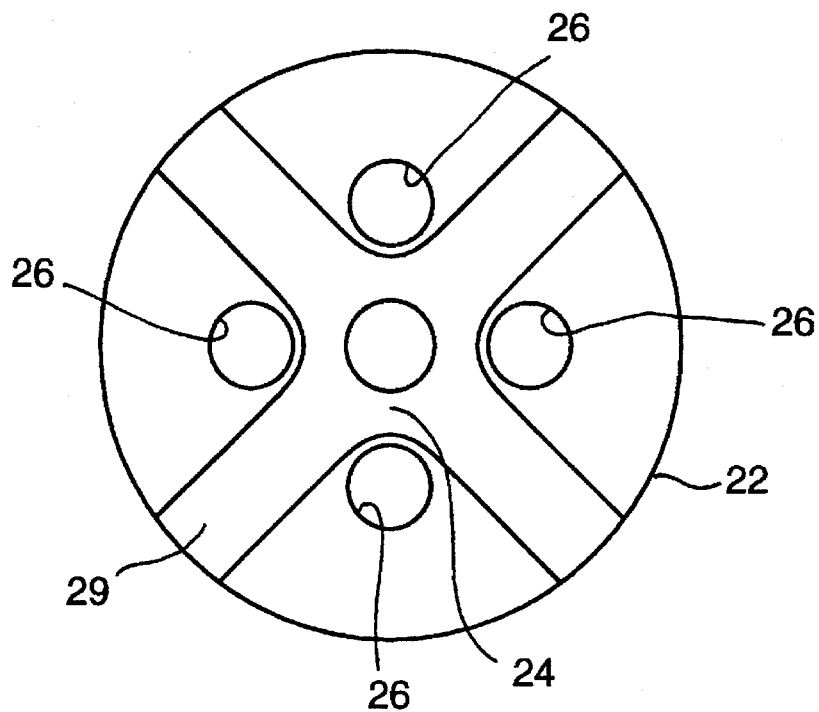
FIG. 22 is a plan view of the burner tile of FIG. 21.
Figure 23:
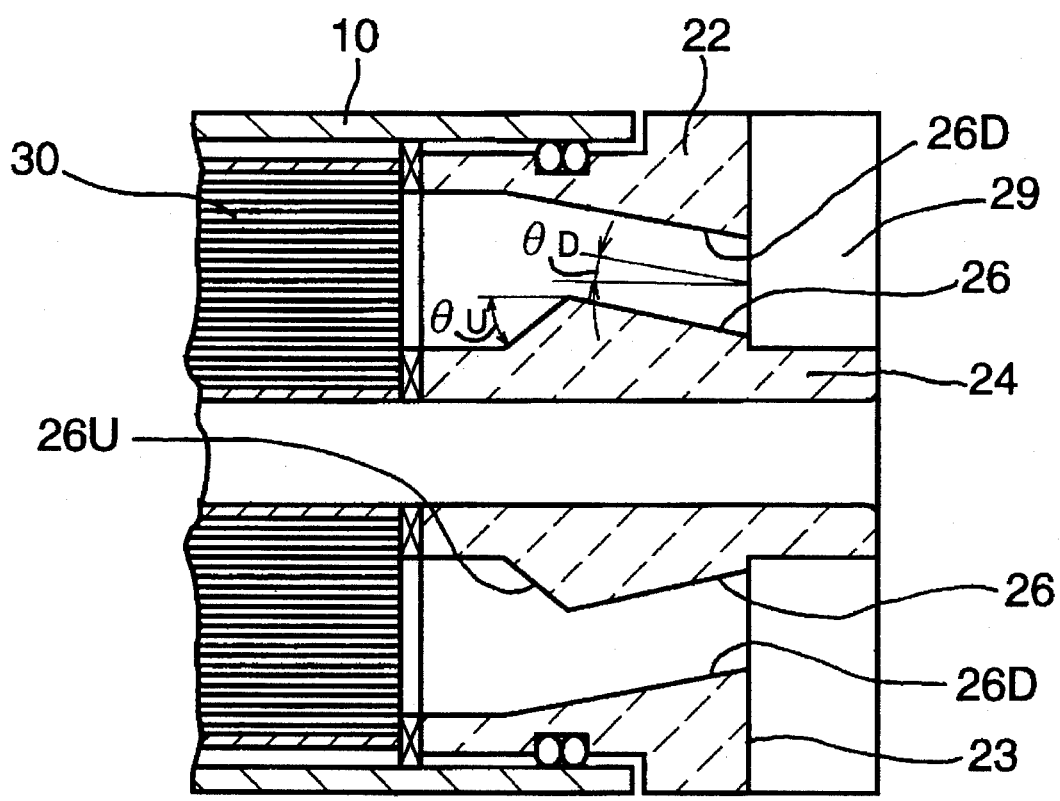
FIG. 23 is a cross-sectional view of a burner tile of a portion of a furnace and a burner for regenerative combustion in accordance with an eleventh embodiment of the present invention.
Figure 24:
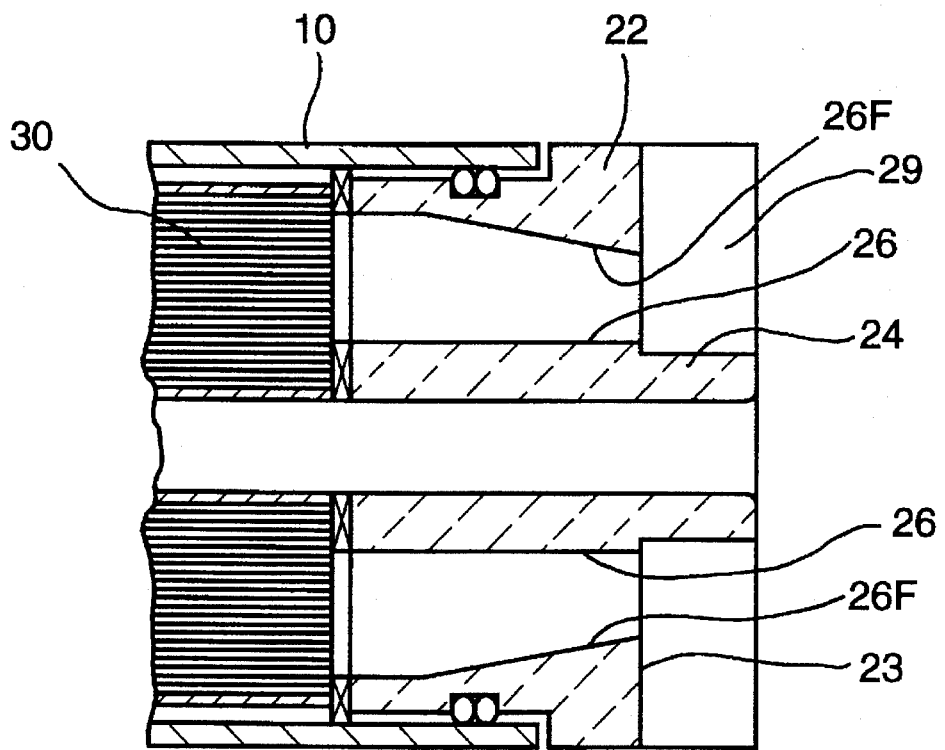
FIG. 24 is a cross-sectional view of a burner tile of a portion of a furnace and a burner for regenerative combustion in accordance with a twelfth embodiment of the present invention.
Figure 25:
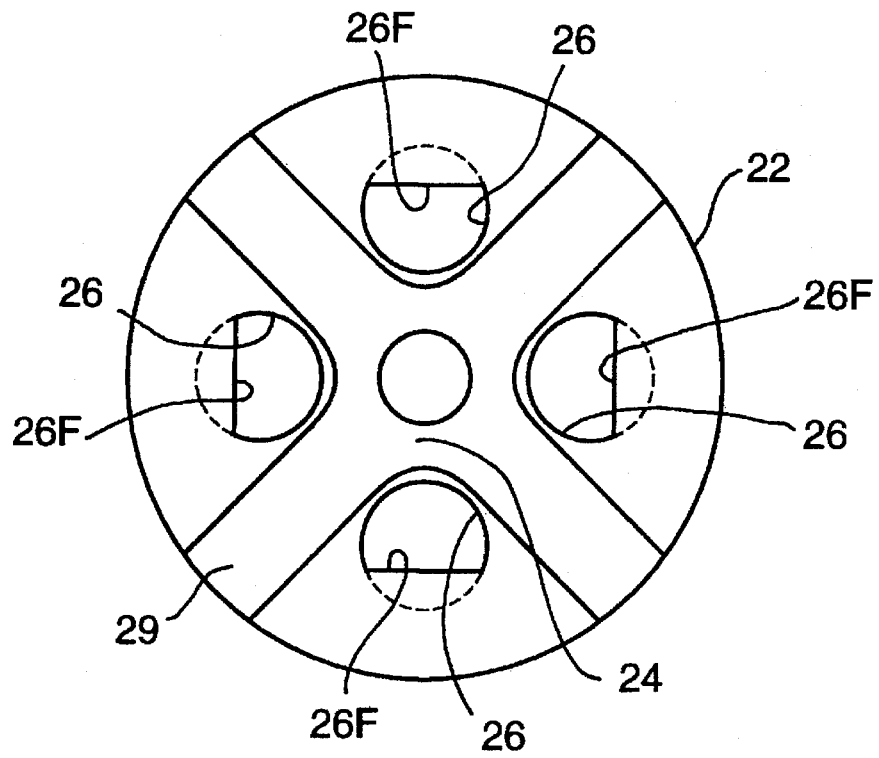
FIG. 25 is a plan view of the burner tile of FIG. 24.
Figure 26:
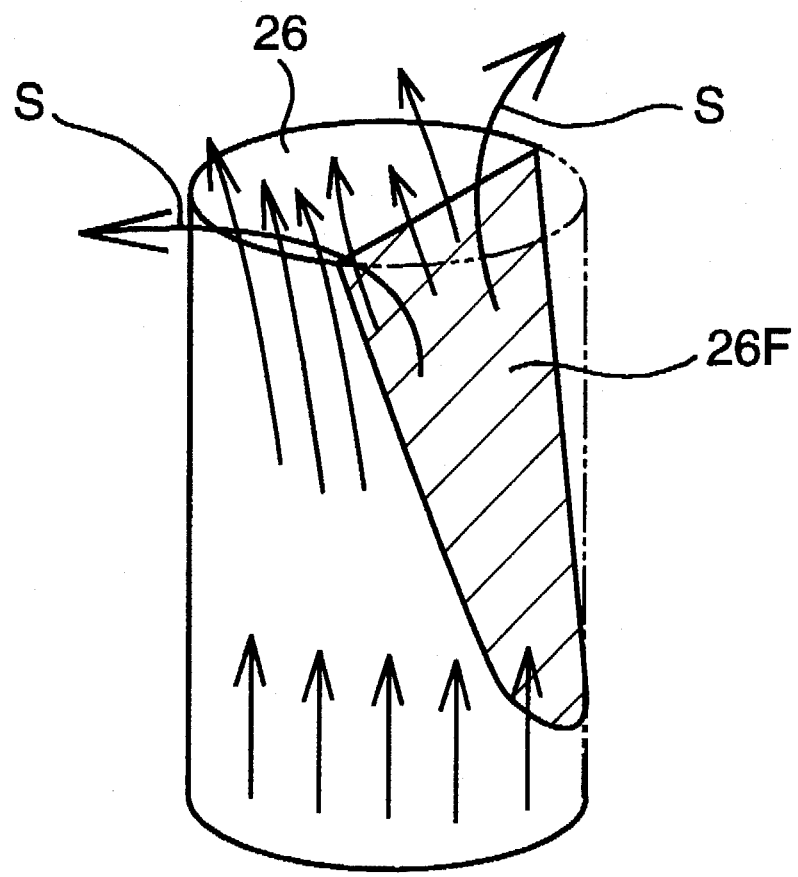
FIG. 26 is an oblique view of a gas flow hole in the burner tile of FIG. 24.
Figure 27:
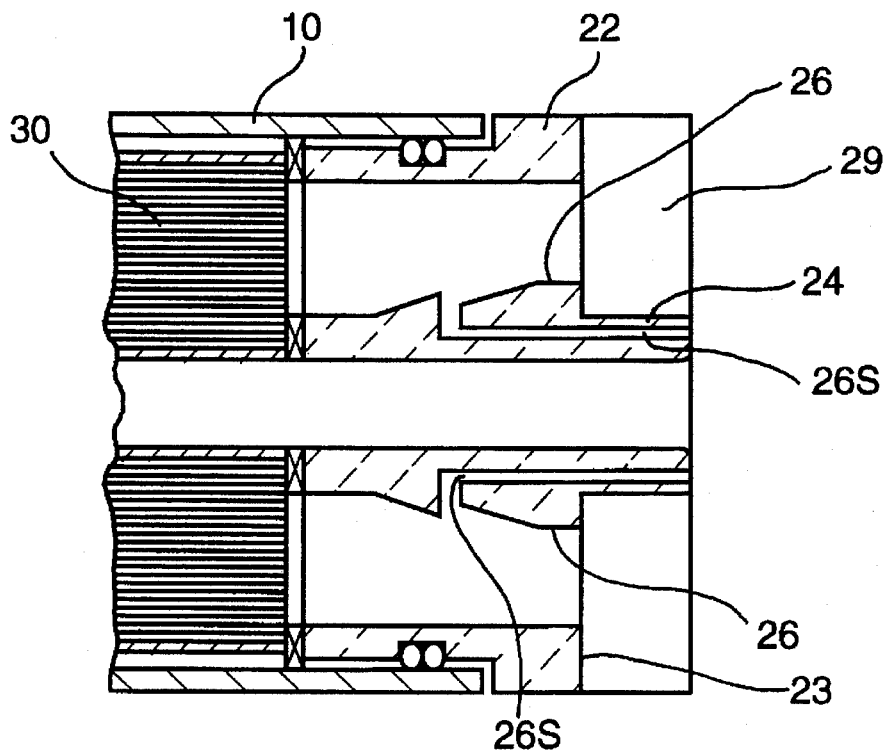
FIG. 27 is a cross-sectional view of a burner tile of a portion of a furnace and a burner for regenerative combustion in accordance with a thirteenth embodiment of the present invention.
Figure 28:
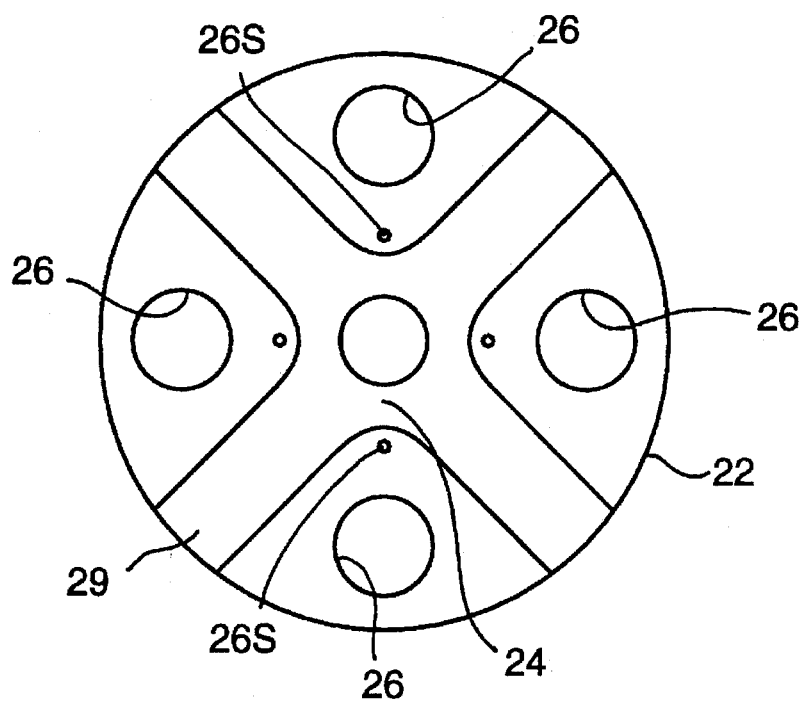
FIG. 28 is a plan view of the burner tile of FIG. 27.
Figure 29:
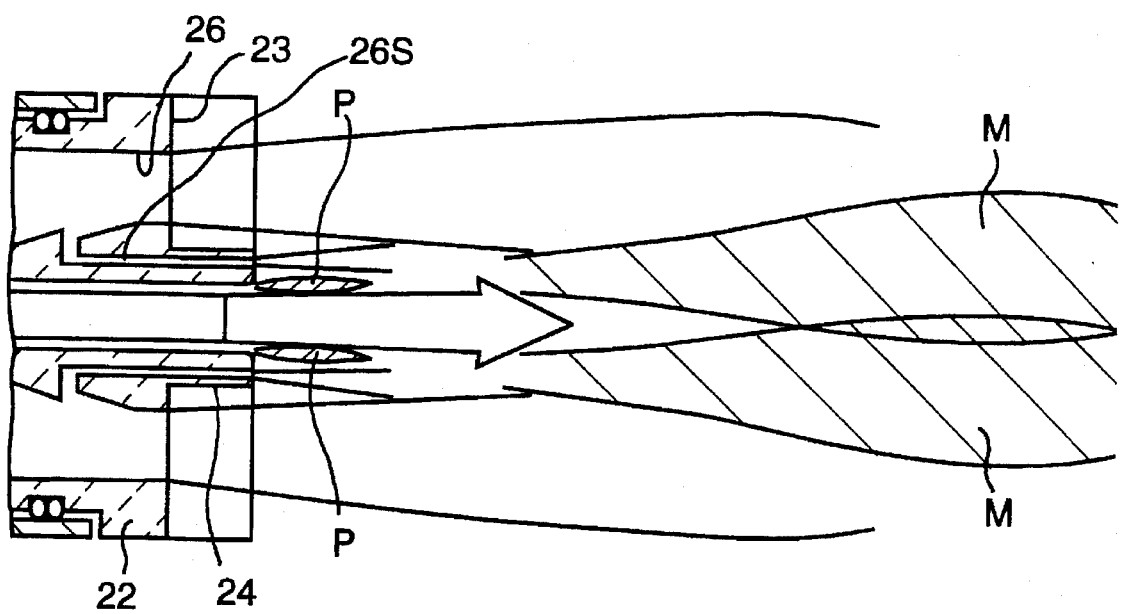
FIG. 29 is a schematic cross-sectional view illustrating a positional relationship between a pilot flame and a main flame.

FIGS. 1–4, 5, 6, 30 and 31 illustrate an industrial furnace, a burner for conducting regenerative combustion, and a combustion method therefor in accordance with a first embodiment of the present invention; FIGS. 7 and 8 illustrate an industrial furnace and a burner in accordance with a second embodiment of the present invention; FIGS. 9–11 illustrate an industrial furnace and a burner in accordance with a third embodiment of the present invention; FIGS. 12 and 13 illustrate an industrial furnace and a burner in accordance with a fourth embodiment of the present invention; FIGS. 14 and 15 illustrate an industrial furnace and a burner in accordance with a fifth embodiment of the present invention; FIGS. 16 and 17 illustrate a sixth embodiment of the present invention; FIG. 18 illustrates a seventh embodiment of the present invention; FIG. 19 illustrates an eighth embodiment of the present invention; FIG. 20 illustrates a ninth embodiment of the present invention; FIGS. 21 and 22 illustrate a tenth embodiment of the present invention; FIG. 23 illustrates an eleventh embodiment of the present invention; FIGS. 24–26 illustrate a twelfth embodiment of the present invention; and FIGS. 27–29 illustrate a thirteenth embodiment of the present invention. Portions common to all of the embodiments of the present invention have the same reference numerals throughout all of the embodiments of the present invention.

The present invention can be applied to any one of an industrial furnace 100 and a burner 1 for conducting regenerative combustion. A case where the present invention is applied to an industrial furnace includes a case where a regenerative combustion burner has a structure separable into a plurality of portions. At least one portion of the plurality of portions (for example, a burner tile or a combination of a burner tile and a casing) is integrally fixed to a furnace wall 5 of the industrial furnace 100 to constitute a portion of the furnace side members or a portion of the furnace itself.

Further, examples of industrial furnaces 100 to which the present invention is applied include: a melting furnace, a sintering furnace, a preheating furnace, a soaking pit, a forging furnace, a heating furnace, an annealing furnace, a solution annealing furnace, a plating furnace, a drying furnace, a heat treatment furnace, a heating furnace for quenching, a tempering furnace, an oxidizing and reducing furnace, a kiln, a baking furnace, a roasting furnace, a molten metal holding furnace, a fore hearth, a crucible furnace, a homogenizing furnace, an aging furnace, a reaction promoting furnace, a distilling furnace, a ladle dry preheating furnace, a mold preheating furnace, a normalizing furnace, a brazing furnace, a carburizing furnace, an oven for drying paint, a holding furnace, a nitriding furnace, a salt bath furnace, a glass melting furnace, boilers including a boiler for electric power generation, incinerators including an incinerator for burning garbage, and a hot water supply apparatus.

Firstly, portions common to all of the embodiments of the present invention will be explained with reference to, for example, FIGS. 1–6, 30 and 31.

Figure 2:
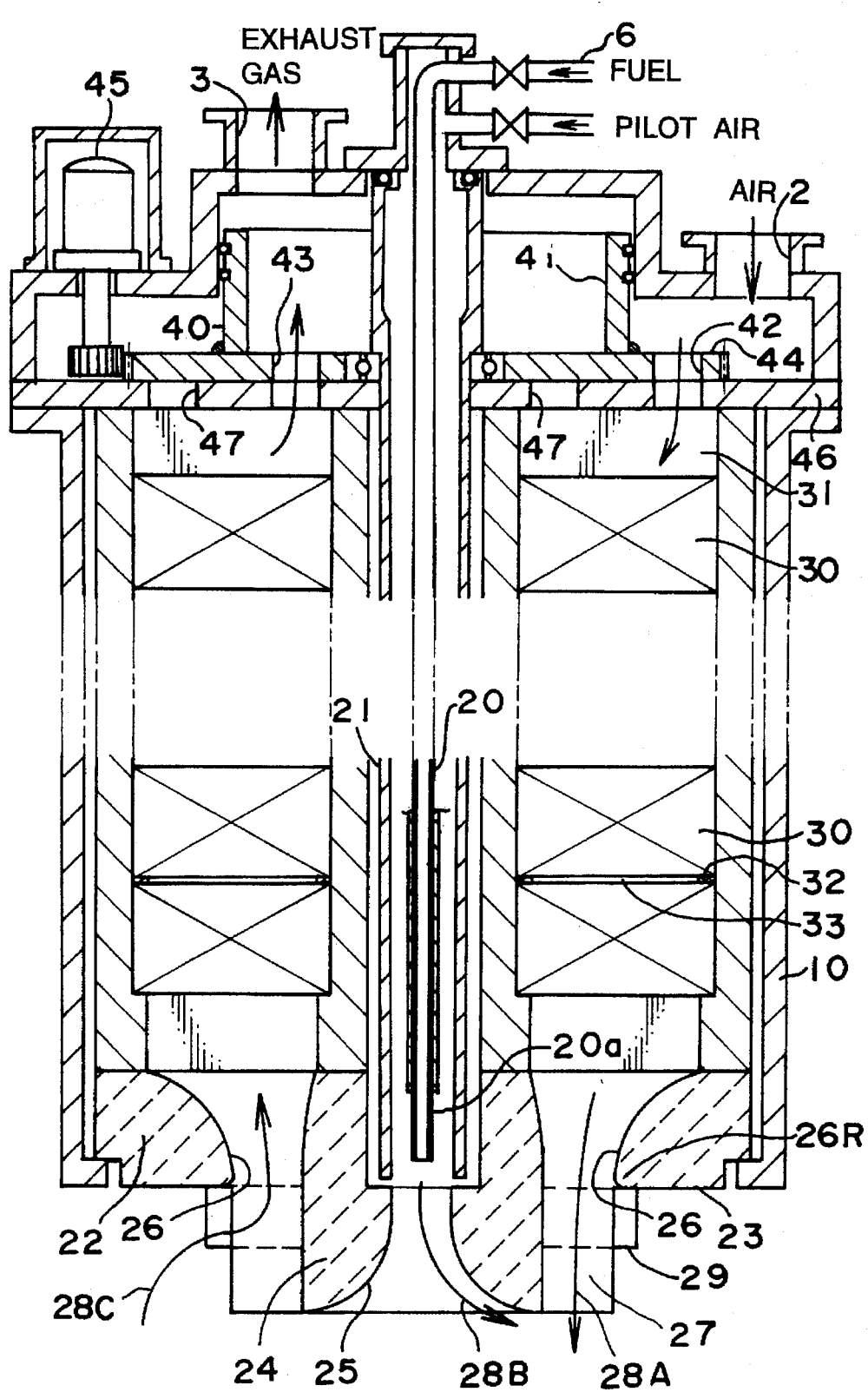
FIG. 2 is an enlarged cross-sectional view of a portion of the furnace and the burner of FIG. 1.

As illustrated in FIGS. 1 and 2, the industrial furnace 100 and the burner 1 for regenerative combustion communicates via a supply air passage 2 with an air supply device 4 (for example, a blower or a compressor for supplying air). Exhaust gas from the furnace is exhausted via an exhaust gas passage 3, where a fan 101 for suctioning exhaust gas is provided, if necessary. Preferably, the blower 4 for supplying air is directly coupled to a switching mechanism 40 of the burner 1 itself. In a case where fan 101 is provided, fan 101 also is directly coupled to the burner 1 itself. This direct coupling structure makes the structure compact. In a case where the fan 101 is provided, the blower 4 and the fan 101 are driven by a common drive device (such as drive motor 102) so that the number of component parts and the space needed for installing the drive means are decreased. Fuel from a fuel injection nozzle 20, pilot air, and supply air flowing through a heat storage member 30 flow into the furnace 100. The switching mechanism 40 switches flow through the heat storage member alternately between supply air flow and exhaust gas flow at regular periods (for example, every few seconds to several minutes, and more particularly, every six to thirty seconds).

Supply air, which is at about 20° C. upstream of the heat storage member 30, is heated while it passes through the heat storage member 30, and is at about 900° C. when it flows into the furnace through a gas flow hole 26. When exhaust gas from the furnace flows into the heat storage member 30, it is at about 1000° C., and it is subsequently cooled in temperature to about 200° C. while it passes through the heat storage member 30, thereby heating the heat storage member 30. Then, the switching mechanism 40 switches the flow through the heat storage member between supply air flow and exhaust gas flow. In this way, the heat from the exhaust gas is stored by the heat storage member 30, and when switched, the heat storage member warms the supply air.

As illustrated in FIGS. 1 and 2, the industrial furnace 100 and the burner 1 for regenerative combustion each includes heat storage member 30, a burner tile 22, and the switching mechanism 40. The heat storage member 30 includes a plurality of sections separated from each other in a circumferential direction of the heat storage member 30. The burner tile 22 is disposed on one side of the heat storage member 30 in an axial direction of the heat storage member 30. The burner tile 22 includes a nozzle insertion hole where fuel injection nozzle 20 is inserted, a plurality of gas flow holes 26 switchable between letting supply air pass therethrough and letting exhaust gas pass therethrough, and an air supply and gas exhaust surface 23 where the gas flow holes 26 are provided. The above switching is conducted by the switching mechanism 40. The switching mechanism 40 is disposed on the other side of the heat storage member 30 in the axial direction of the heat storage member 30. Each of the industrial furnace 100 and the burner 1 for conducting regenerative combustion may further include a casing 10 which houses the fuel injection nozzle 20, the heat storage member 30, and the switching mechanism 40 therein.

FIG. 2 illustrates a portion of the industrial furnace 100 and the burner 1 in an enlarged manner.

The heat storage member 30 is constructed of heat resistant material, such as ceramic or heat resistant metallic alloy. Preferably, the heat storage member 30 has a monolithic honeycomb structure to provide a large gas contact surface area. However, the heat storage member 30 is not limited to a honeycomb structure, and may alternatively be a bundle of wire rods or pipes each having a small diameter. The heat storage member 30 allows gas to pass therethrough along the axial direction thereof. The heat storage member 30 is sectioned in the circumferential direction of the member 30 by a partition 31 or a plurality of sleeves arranged on a circle. Preferably, the heat storage member 30 is divided into a plurality of portions also in the axial direction of the heat storage member 30 to prevent cracks due to temperature gradients and to make construction easy. When the plurality of portions is assembled, a gap 33 (for example, a gap of about 3–5 mm) is provided between two adjacent portions of the heat storage member by inserting a heat resistance spacer 32. A turbulence flow is therefore generated in the gap. By generating a turbulence flow in the gap, heat transfer from the exhaust gas to the heat storage member 30 and from the heat storage member 30 to the supply air is improved.

The fuel injection nozzle 20 extends axially at a central portion of the burner. A pilot air pipe 21 extends coaxially with the fuel injection nozzle 20, and pilot air flows through an annular passage formed between an outer surface of the fuel injection nozzle 20 and an inner surface of the pilot air pipe 21. The fuel injection nozzle 20 is covered with an electric insulator except for a tip portion thereof. A pilot fuel outlet 20a is formed in the tip portion of the fuel injection nozzle for injecting pilot fuel therethrough. The pilot fuel is ignited by an electrical spark formed between the tip portion of the fuel injection nozzle 20 and the pilot air pipe 21.

Figure 3:
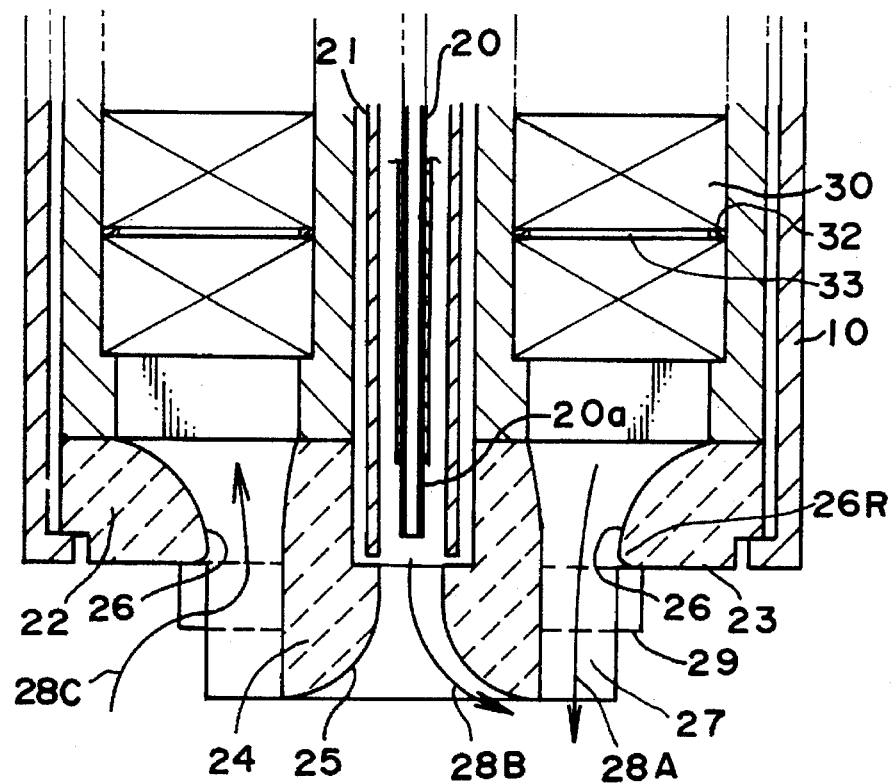
FIG. 3 is a cross-sectional view of a burner tile of the furnace portion and the burner of FIG. 2.
Figure 4:
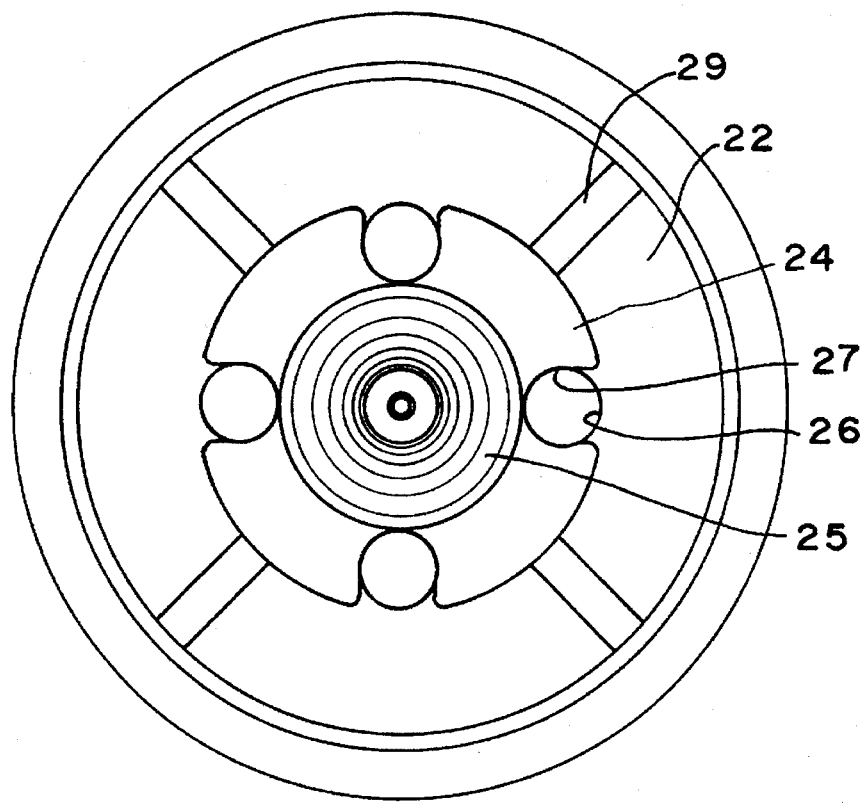
FIG. 4 is a plan view of the burner tile of FIG. 3.

FIGS. 3 and 4 illustrate the burner tile 22. The burner tile 22 is constructed from heat resistant material such as ceramic or heat resistant alloys. The burner tile 22 includes a protruding portion 24 extending ahead from the air supply and gas exhaust surface 23 toward an opposite end of the furnace. The burner tile 22 also includes a fuel release surface 25, formed on an inner surface of the protruding portion out to a front end of the protruding portion, for releasing a mixture of fuel and pilot air. An axial length of the protruding portion 24 is equal to or greater than about one third of a diameter of any one of the plurality of gas flow holes 26, and, more preferably, equal to or greater than a half of a diameter of the gas flow hole 26 in order to obtain the benefit of the protruding portion described hereinafter.

The burner tile 22 further includes an air nozzle separator 29 protruding ahead from the air supply and gas exhaust surface 23 and extending in a radial direction of the burner tile 22 between adjacent gas flow holes 26. The air nozzle separator 29 prevents supply air injected from a gas flow hole 26 letting supply air pass therethrough from directly passing to a gas flow hole letting exhaust gas pass therethrough so that substantially all portions of supply air are used for combustion.

The fuel release surface 24 may be formed so as to be spread in a direction toward the front end of the protruding portion 24. The spread may be curved or tapered, and the surface may be smooth or rugged.

A plurality of guide grooves 27 may be formed in a radially outer portion of the protruding portion 24 so as to extend in an axial direction of the protruding portion 24 and to coincide in position with the gas flow holes 26 in a circumferential direction of the protruding portion 24. In a case where the guide grooves 27 are provided, at least a portion of the supply air flowing out through a hole of the gas flow holes 26 acting as a supply air passing hole flows through the guide groove 27 to form to a strongly directed, high speed flow 28A.

The gas flow hole 26 is smoothly throttled in cross section toward the air supply and gas exhaust surface 23 in a supply air flow direction except an end portion of the gas flow hole close to the air supply and gas exhaust surface 23, so that a flow speed of the supply air is increased while it passes through the gas flow hole 26. At a corner of the end portion of the gas flow hole close to the air supply and gas exhaust surface 23, preferably a round 26R is formed so that exhaust gas can smoothly flow into the gas flow hole 26. Further, the gas flow hole 26 approaches an axis of the protruding portion 24 in a supply air flow direction. Preferably, the gas flow hole 26 partially interferes with a contour of the protruding portion 24 at the air supply and gas exhaust surface 23, and the guide groove 27 coincides with the interference portion so that the gas flow hole 26 is not closed by the protruding portion 24. Alternatively, the gas flow hole 26 may be arranged so as to contact the contour of the protruding portion 24, and in such a case a guide groove is not formed in a radially outer portion of the protruding portion 24.

The switching mechanism 40 includes a stationary disk 46, a rotatable disk 44 slidably contacting the stationary disk 46, and a partitioning wall 41 separating a supply air flow area and an exhaust gas flow area from each other. The stationary disk 46 includes a plurality of apertures 47. The rotatable disk 44 includes a plurality of openings for gas flow which are opened and closed in accordance with rotation of the rotatable disk 44. The openings include at least one supply flow opening 42 communicating with the supply air flow area located on one side of the partitioning wall 41 and at least one exhaust gas flow opening 43 communicating with the exhaust gas flow area located on the other side of the partitioning wall 41.

The switching mechanism 40 includes movable members. More particularly, in FIG. 5, the partitioning wall 41 and the rotatable disk 44 are movable members. Remaining members of the switching mechanism 40 such as the stationary disk 46 are stationary members. The movable members of the switching mechanism 40 are driven by a drive device 45 (for example, an electric motor, an air cylinder, etc.) in one direction or in opposite directions. Because a plane of the rotatable disk 44 perpendicular to an axis of the rotatable disk 44 and a plane of the stationary disk 46 perpendicular to an axis of the stationary disk 46 slidably contact with each other, the contact surface area is much larger than a contact surface area in the case of the conventional burner where the end surface of the dividing wall and the rotatable disk of the switching mechanism contact each other. A high seal effect is therefore obtained in the switching mechanism 40. To increase the seal integrity, the rotatable disk 44 may be urged against the stationary disk 46 by springs 51 and 52 (FIGS. 9, 12, and 14).

Downstream of each section of the heat storage member 30, at least one gas flow hole 26 formed in the burner tile 22 is provided. Shapes and positions of the openings 42 and 43 formed in the rotatable disk 44 and shapes and positions of the apertures 47 formed in the stationary disk 46 are determined relative to each other so that a total cross-sectional area of the at least one gas flow hole 26 formed in the burner tile 22 and covered by the exhaust gas flow opening 43 formed in the rotatable disk 44 is equal to or greater than a total cross-sectional area of the at least one gas flow hole 26 formed in the burner tile 22 and covered by the supply air flow opening 42 formed in the rotatable disk 44. For example, in the case of FIGS. 5 and 6, the number of the gas flow holes 26 covered by the supply air flow openings 42 is one or two, and the number of the gas flow holes 26 covered by the exhaust gas flow openings 43 is three or two. Thus, the total cross-sectional area of the gas flow holes 26 providing a supply air is throttled compared with that the gas flow holes 26 discharging an exhaust gas, so that a speed of the supply air is desirably increased. The number of the gas flow holes acting as a supply air passing hole and the number of the gas flow holes acting as an exhaust gas passing hole may not necessarily be an integer.

Similarly, shapes and positions of the openings 42 and 43 formed in the rotatable disk 44 and shapes and positions of the apertures 47 formed in the stationary disk 46 are determined relative to each other such that a total volume of the at least one section of the heat storage member 30 covered by the exhaust gas flow opening 43 formed in the rotatable disk 44 is equal to or greater than a total volume of the at least one section of the heat storage member 30 covered by the supply air flow opening 42 formed in the rotatable disk 44. For example, in the case where the heat storage member 30 is sectioned into four sections by the dividing wall 31, two or three sections are covered by exhaust gas flow opening 43, and one or two sections are covered by the supply air flow opening 42. By increasing the volume of sections covered by the exhaust gas flow opening 43, the speed of exhaust gas passing through the heat storage member 30 is slowed so that the heat storage member 30 stores more heat.

A combustion method conducted using the above structures common to all of the embodiments of the present invention will be explained below.

The combustion method includes the steps of supplying supply air into the furnace 100 through at least one hole acting as a supply air flow hole among the plurality of gas flow holes 26 provided at the air supply and gas exhaust surface 23, mixing fuel and the supply air with each other ahead the air supply and gas exhaust surface 23, burning a mixture of the fuel and the supply air, and exhausting burnt gas from the furnace 100 through at least one hole acting as an exhaust gas flow hole among the plurality of gas flow holes 26 and having a total cross-sectional area equal to or greater than a total cross-sectional area of the at least one hole acting as a supply air flow hole.

Further, the combustion method includes supplying supply air into the furnace 100 through the at least one hole acting as a supply air flow hole among the plurality of gas flow holes 26 provided at the air supply and gas exhaust surface 23. The supply air draws and entrains a portion of burnt gas while the supply air is flowing along a side surface of the protruding portion 24 from the air supply and gas exhaust surface 23 to the front end of the protruding portion 24. This recirculates the portion of burnt gas in the furnace 100. The supply air and the recirculated portion of burnt gas are mixed with fuel released from the fuel release surface 25, and the mixture of the supply air, the recirculated portion of burnt gas, and the fuel is flowed ahead the front end of the protruding portion 24 to form a combustion zone extending deeply in the furnace where the mixture is burned.

The above combustion method may further include exhausting burnt gas from the furnace 100 through the at least one hole acting as an exhaust gas flow hole among the plurality of gas flow holes 26, wherein a short path of the fuel release from the fuel release surface 25 directly to the at least one hole acting as an exhaust gas flow hole is suppressed by spacing a front end of the fuel release surface 25 from the air supply and gas exhaust surface 23 by a length of the protruding portion 24.

Effects and advantages obtained by the above structures or methods common to all of the embodiments of the present invention will be explained below.

Because the rotatable disk 44 and the stationary disk 46 of the switching mechanism 40 contact with each other at large-area planes thereof perpendicular to the axes thereof, leakage of supply air to the exhaust gas through a clearance between the disks 44 and 46 is suppressed, and as a result, a speed of supply air injected into the furnace is increased.

Figure 30:
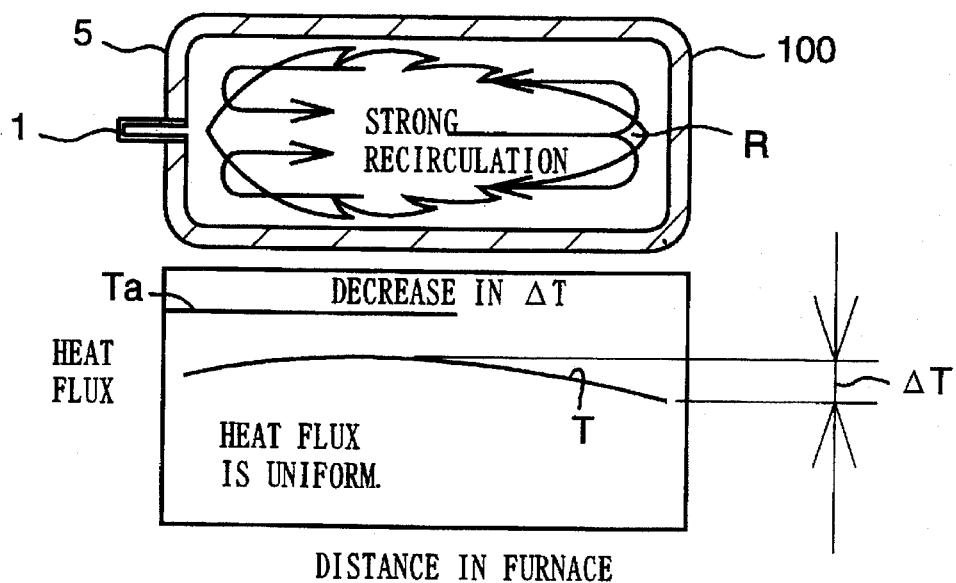
FIG. 30 is a schematic cross-sectional view illustrating the industrial furnace and a heat flux distribution thereof in accordance with all of the embodiments of the present invention.

Further, because the shapes and positions of gas flow openings 42 and 43 formed in the rotatable disk 44 and the apertures 47 formed in the stationary disk 46 are determined such that the total cross-sectional area of gas flow holes 26 acting as supply air flow holes is equal to or smaller than the total cross-sectional area of gas flow holes 26 acting as exhaust gas flow holes, the speed of the supply air injected into the furnace is further increased. Due to an increase in the speed of the supply air flow, the supply air flow strongly draws and entrains fuel and a portion of burnt gas in the furnace so that the portion of burnt gas is strongly recirculated in the furnace 100, as shown in FIG. 30. Further, because the fuel release surface 25 is distanced from the air supply and gas exhaust surface 23, the supply air flow draws and entrains therein a portion of burnt gas in the furnace while the supply air is flowing along the side surface of the protruding portion 24, so that the burnt gas is further strongly recirculated in the furnace (FIG. 30).

Because the supply air flow strongly draws fuel, a short path of fuel to the exhaust gas flow hole is suppressed so that imperfect combustion of fuel, accompanied by generation of CO, is also suppressed.

Figure 31:
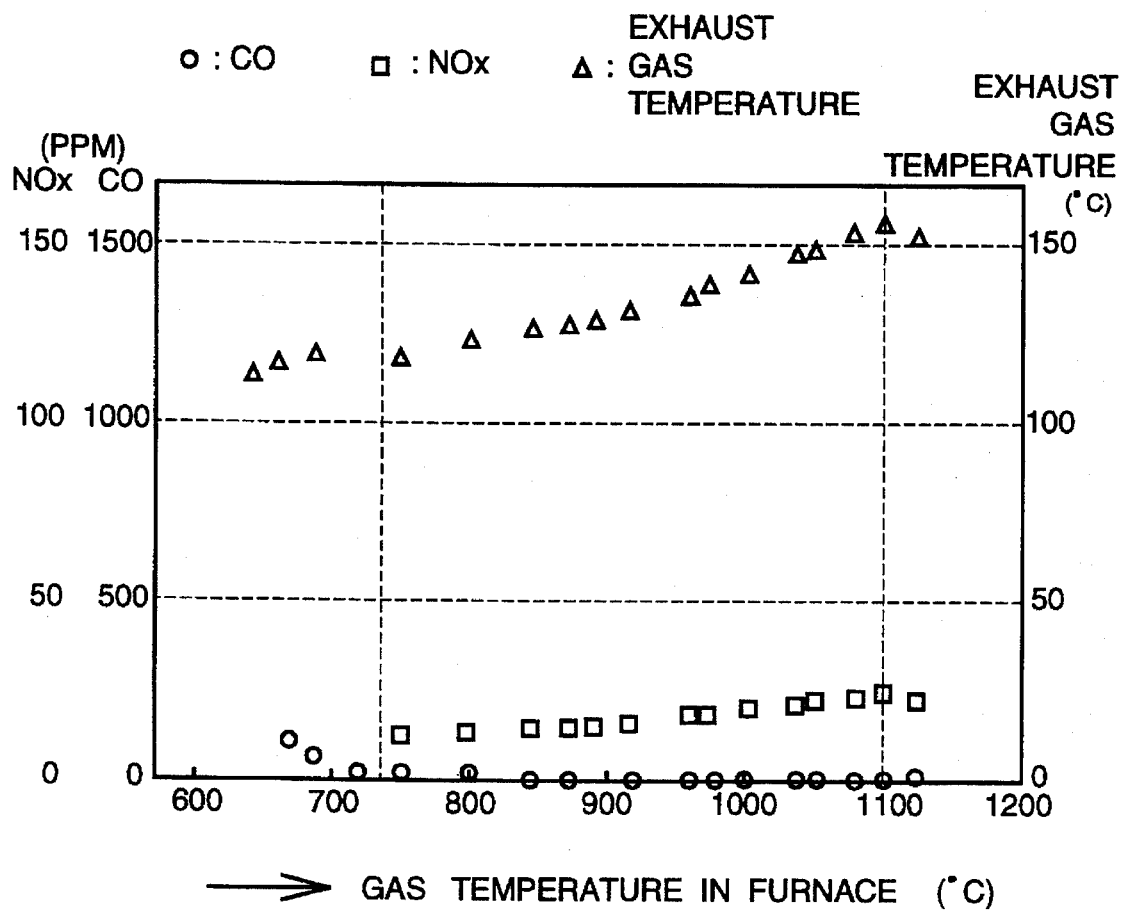
FIG. 31 is a graph illustrating a relationship between CO and NOx generation and a furnace temperature.
Figure 32:
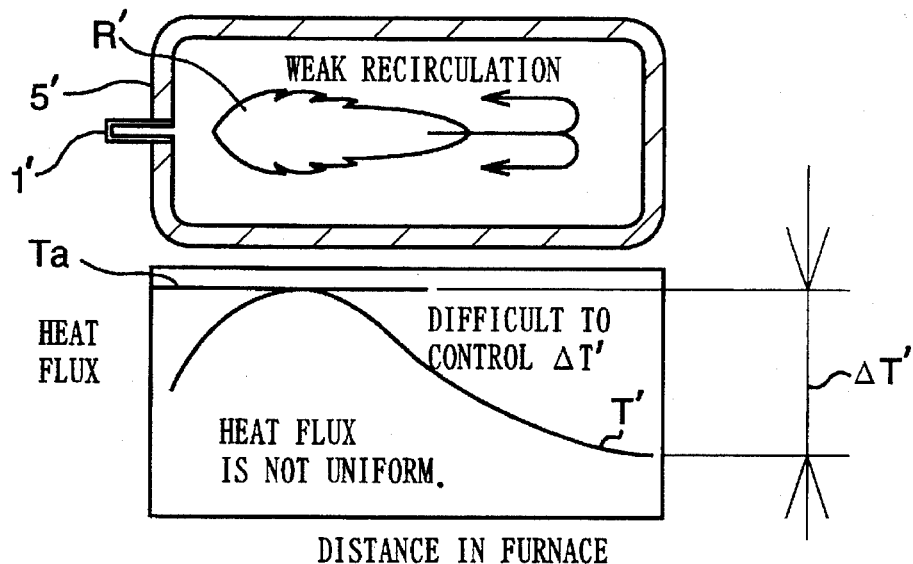
FIG. 32 is a schematic cross-sectional view of a conventional industrial furnace having a burner for regenerative combustion.

Further, because the burnt gas in the furnace is strongly drawn by the supply air flow to recirculate in the furnace, combustion is slackened. As a result, an amount of NOx generated is decreased to about 20 ppm, as shown in FIG. 31. For comparison, in the conventional industrial furnace 5' having a burner 1' for regenerative combustion shown in FIG. 32, about 200 ppm of NOx is generated, and in the conventional furnace having a burner for non-regenerative combustion, about 2,000 ppm of Nox is generated. Thus, the NOx generation is greatly decreased according to the present invention. Furthermore, due to the slack of combustion, combustion zone R is lengthened toward an opposite end of the furnace compared with combustion zone R' formed in the conventional furnace. Temperature distribution T is also made uniform, as shown in FIG. 30, (i.e., a temperature differential $\Delta T$ with the furnace according to the present invention is smaller than a temperature differential $\Delta T'$ with the conventional furnace). Thus, when the maximum temperature T should be less than the allowable temperature Ta of the furnace wall, the temperature T of the combustion zone R can be raised to a temperature close to the allowable temperature over the entire range of the combustion zone R, unlike the conventional furnace. As a result, the heat flux can be raised over the entire range of the combustion zone R, and a heat transfer at a high efficiency is possible. In a case where the same heat transfer is to be obtained, the furnace can be made compact, space efficiency is improved, and initial cost of the furnace and equipment therefor is decreased. Further, due to the uniform temperature, the furnace wall is not heated to an excessively high temperature, so that the life of the furnace is lengthened and maintenance costs for the furnace is decreased. Furthermore, due to the slack of combustion, combustion noise is also decreased.

Further, the following additional advantages are also obtained.

Due to the slidable contact of the rotatable disk 44 with the stationary disk 46, freedom for designing the switching mechanism 40 is increased, so that a design that will not decrease a supply air amount at a switching time is possible, and a shape of the heat storage member can be selected more freely.

In a case where the fuel injection nozzle 20, the heat storage member 30, and the switching mechanism 40 are housed in the casing 10, piping for connecting the heat storage member 30 and the switching mechanism 40 does not need to be provided, so that the apparatus becomes compact. Further, in a case where such piping is provided, purging exhaust gas in the piping will be necessary at switching, but in the present invention, such purging is unnecessary.

Further, since the total volume of the section or sections of the storage member 30 covered by the exhaust gas flow opening 43 formed in the rotatable disk 44 is equal to or greater than the total volume of the section or sections of the heat storage member 30 covered by the supply air flow opening 42 formed in the rotatable disk 44, a speed of the exhaust gas while passing through the heat storage member 30 is decreased, so that the heat storage member 30 can effectively retrieve more heat from the exhaust gas. Heat efficiency of the furnace is thereby improved.

Further, because the protruding portion 24 protrudes from the air supply and gas exhaust surface 23 and the fuel release surface 25 is formed in the protruding portion 24, a front end of the fuel release surface 25 is spaced from the hole 26 acting as exhaust gas flow holes. Therefore, a mixture 28B of fuel and pilot air released from the fuel release surface 25 is not likely to be drawn by an exhaust gas flow 28C. The exhaust gas flow 28C collects in the vicinity of the exhaust gas flow hole 26 and thus is not strong in the vicinity of the front end of the protruding portion 24.

If fuel is drawn and entrained by the exhaust gas flow, a considerably large portion of the fuel will flow directly to the exhaust gas flow hole 26 without being burnt and will cause imperfect combustion and generate much CO. However, in the present invention, such imperfect combustion is suppressed, and amount of CO generated is decreased. FIG. 31 illustrates combustion test results conducted at 100,000 Kcal/h using the furnace and the burner in accordance with the present invention. As evident from FIG. 31, the amount of CO contained in exhaust gas is very small.

Further, when the mixture of fuel and supply air is flowing inside the protruding portion 24, the wall of the protruding portion 24 prevents the mixture from being drawn by the exhaust gas flow. Since the fuel release surface 25 is spread, the mixture is likely to be drawn by the supply air flow to mix with each other and to be relatively perfectly burned, so that CO generation is further suppressed. Due to the protruding portion 24 and the spread structure of the fuel release surface 25, the amount of CO in exhaust gas, which is about 3,000 ppm in the conventional structure is decreased to a level equal to or less than about 200 ppm.

In a case where the guide grooves 27 are formed in the outer side surface of the protruding portion 24, at least a portion of the supply air released from the gas flow hole 26 enters the guide grooves 27 and flows ahead from the guide grooves with a strong direction. This flow has high speed because the flow is not spread and loses little of its speed in the guide groove 27. The power of this flow for drawing fuel is strong and prevents the fuel from being drawn by the exhaust gas flow. The supply air flow further decreases the above-noted 200 ppm of CO to a level less than about 100 ppm.

When fuel is mixed with supply air having such strong directional focus and a high speed, mixing is conducted gradually so that the combustion is slack and perfect. Due to this slack combustion, reaction of $N_2$ with $O_2$ is also slack and generation of NOx is greatly suppressed.

Due to the high speed of the supply air and the slack combustion, a combustion flame extends deeply into the furnace so that substantially all portions inside the furnace are heated substantially uniformly and even objects disposed far away from the burner can be heated.

Further, because the gas flow hole 26 is throttled in cross section in a supply air flow direction toward the air supply and gas exhaust surface 23, the supply air is increased in speed when it passes through the gas flow holes 26. Due to this increase in speed, the above effect will be strengthened. Because the axis of the gas flow holes 26 approaches the axis of the protruding portion 24, a considerably large portion of the supply air enters the guide groove 27 to enhance the directional flow of the supply air flow. If necessary, in order to raise reactivity, the axis of the gas flow hole 26 may be inclined inwardly (i.e., in a direction where the supply air approaches the axis of the protruding portion) by some angle (e.g., 10–20 degrees.)

Next, structures and advantages unique to each embodiment of the present invention will be explained.

Figure 5:
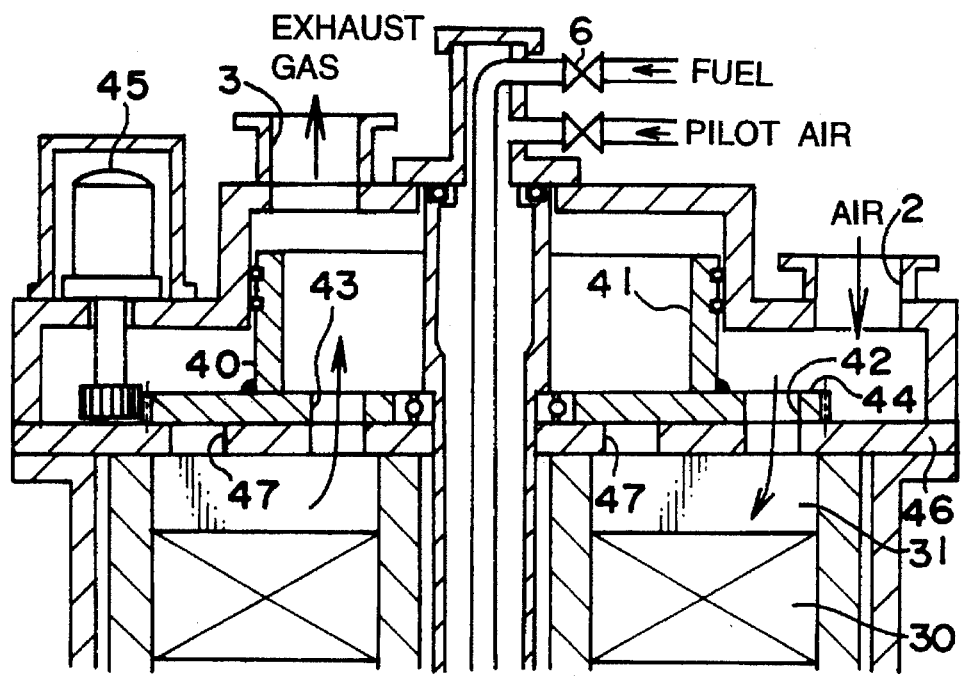
FIG. 5 is a cross-sectional view of a switching mechanism of the furnace portion and the burner of FIG. 2.
Figure 6:
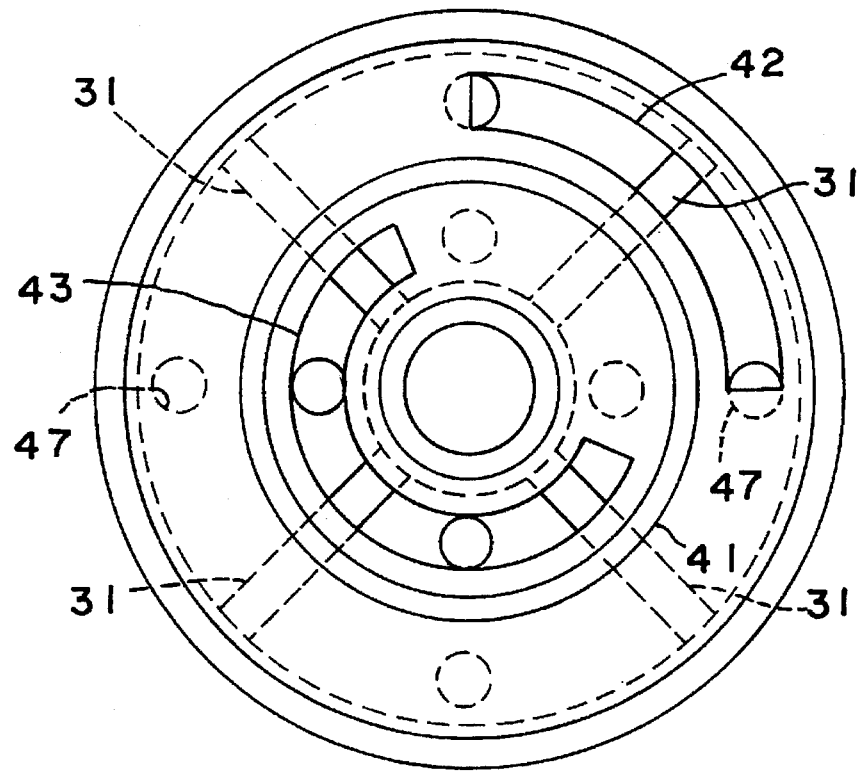
FIG. 6 is a plan view of the switching mechanism of FIG. 5.

In the first embodiment of the present invention, as illustrated in FIGS. 5 and 6, the heat storage member 30 is sectioned by a dividing wall 31. The dividing wall 31 extends in a radial direction of the heat storage member 30.

In contrast, the partitioning wall 41 of the switching mechanism 40 extends in a circumferential direction of the switching mechanism 40 to define supply air flow area communicating with the supply air passage 2 on one side of the wall 41 and an exhaust gas flow area communicating with the exhaust gas passage 3 on the other side of the wall 41.

In the rotatable disk 44, the supply air flow opening 42 is formed on one side of the partitioning wall 41 and the exhaust gas flow opening 43 is formed on another side of the partitioning wall 41. The supply air flow opening 42 is provided on the side of the supply air passage 2 and extends in the form of an arc. The exhaust gas flow passage 43 is provided on the side of the exhaust gas passage 3 and also extends in the form of an arc.

In the stationary disk 46, the apertures 47 are provided inside and outside the partitioning wall 41 at positions corresponding to intermediate positions between the dividing walls 31 sectioning the heat storage member 30.

The rotatable disk 44 is rotated in one direction only. Because of unidirectional rotation, an electric motor 45 can be used as a drive device therefor. The motor 45 is disposed on the side of the supply air passage 2 so that the motor 45 is not affected by heat of the exhaust gas.

The heat storage member 30 is divided into four sections in the circumferential by the dividing walls 31. The exhaust gas flow openings 43 cover two or three sections and the supply air flow openings 42 cover one or two sections. The positional relationship between the openings 42 and 43 are determined such that the sections covered by the openings 43 do not interfere with each other. If this non-interference condition is satisfied, the number of sections of the heat storage member 30 can be other than four.

With respect to operation and advantages of the first embodiment of the present invention, since the dividing wall 31 extends radially, any section of the heat storage member 30 can be switched between air supply and gas exhaust by rotating the rotatable disk 44. More particularly, when the rotatable disk 44 is rotated, the openings 42 and 43 move relative to the stationary apertures 47, and the region where supply air passes and the region where exhaust gas passes shift from one section to another. As a result, air supply and gas exhaust are switched continuously. Further, because the partitioning wall 41 of the switching mechanism 40 extends circumferentially, despite rotation of the rotatable disk 44, the movable supply air flow opening 42 communicates with the stationary supply air passage 2 at all rotational positions of the rotatable disk 44. The movable exhaust gas flow opening 43 also communicates with the stationary exhaust gas passage 3 at all rotational positions of the the rotatable disk 44.

In the second embodiment, as illustrated in FIGS. 7 and 8, an area covered by the exhaust gas flow opening 43 is greater than an area covered by the supply air flow opening 42. A seal member 48 is disposed between an outer surface of the rotatable disk 44 and the stationary disk 46 to seal between the disks 44 and 46.

Downstream of the exhaust gas flow opening 43 in an exhaust gas flow direction, an exhaust gas suctioning mechanism 49 is disposed for jetting out a portion of supply air into the exhaust gas passage in the same direction as the exhaust gas flow direction thereby biasing exhaust gas in a downstream direction. Further, a pilot air inlet 50 is formed in a portion of the pilot air pipe 21 located inside the rotatable disk 44, and through the inlet 50 a portion of supply air is introduced into the pilot air pipe 21.

With respect to operation and advantages of the second embodiment of the present invention, since the apertures 47 formed in the stationary disk 46 are used not only for air supply but also for gas exhaust, an area of the aperture 47 can be large although the switching mechanism is relatively compact. Therefore, the disk 46 is free from distortion and can be applied to a large-capacity burner. Further, since the seal member 48 is disposed at an outer surface of the rotatable disk 44, leakage between the outer surface of the rotatable disk 44 and the stationary disk 46 can be effectively prevented. Further, since an excess supply air is utilized for the exhaust gas suctioning mechanism 49, a particular exhaust gas suctioning blower is not necessary, so that the apparatus can be compact and cost reduction is possible.

The third embodiment of the present invention is an improvement of the second embodiment of the present invention. In the third embodiment of the present invention, as illustrated in FIGS. 9–11, a plurality of parallel cylindrical sleeves 31S are provided, and each section of the heat storage member 30 is inserted in each cylindrical sleeve 31S. The portion of the heat storage member in the sleeve 31S is held via a cylindrical collar 10b by the stationary disk 46. Therefore, when the portion of the heat storage member is exchanged, the stationary disk 46 is first disconnected from the end plate 10a of the casing 10. The collar 10b and the portion of the heat storage member are then taken out of the sleeve 31S. After the portion of the heat storage member is replaced by a new one, the collar 10b is inserted into the sleeve 31S and then the stationary disk 46 is coupled to the end plate 10a of the casing 10.

Each of the gas flow holes 26 formed in the burner tile 22 includes a funnel-shaped portion 26A which is gradually enlarged in cross section toward an upstream of a flow direction of supply air so that a surface of each gas flow hole 26 is connected smoothly to an inside surface of each cylindrical sleeve 31S via a surface of the funnel-shaped portion 26A. Since both a cross section of the funnel-shaped portion 26A and a cross section of the sleeve 31S are both circular, the funnel-shaped portion 26A and the sleeve 31S can be connected without any step. As a result, the focused flow of the supply air from the hole 26 is kept strong.

The rotatable disk 44 and the stationary disk 46 have metal-to-metal contact to form a seal therebetween. The rotatable disk 44 may be biased against the stationary disk 46 by springs 52. There is no O-ring between sliding surfaces of the disks 44 and 46 in this case. The springs 52 are provided at a plurality positions in the circumferential direction of the switching mechanism 40 so that the rotatable disk 44 is pushed against the stationary disk 46 by a uniform force in the circumferential direction of the switching mechanism.

A torque from the motor 45 is transmitted to the rotational disk 44 via a drive gear 45A, a driven gear 45B engaging with the drive gear 45A, a sleeve 45C fixedly coupled with the driven gear 45B, and a coupling 45D. A spring 51 prevents the driven gear 45B from tilting.

The supply air flow opening 42 and the exhaust gas flow opening 43 formed in the rotatable disk 44 have a semi-circular shape, and the apertures 47 formed in the stationary disk 46 also have a semi-circular shape. A stationary disk side end of the supply air flow opening 42 and a stationary disk side end of the exhaust gas flow opening 43 are positioned on the same circle. Shapes and positions of the openings 42 and 43 and the apertures 47 are determined relative to each other, such that a ratio of an area where the exhaust gas flow opening 43 and the aperture 47 coincide with each other to an area where the supply air flow opening 42 and the aperture 47 coincide with each other is greater than 1 (more particularly, two or three), so that the speed of the supply air flow is greater than the speed of the exhaust gas flow.

The supply air passage 2 communicating with the supply air flow opening 42 is connected to the switching mechanism 40 in an axial direction of the switching mechanism 40. The exhaust gas passage 3 communicating with the exhaust gas flow opening 43 is connected to the switching mechanism 40 in a direction perpendicular to the axial direction of the switching mechanism 40. With this structure, the supply air passage 2 and the exhaust gas passage 3 are greatly distanced from each other, and the drive motor 45 is easily connected to the switching mechanism 40 at a space between the passages 2 and 3.

With respect to advantages obtained in the third embodiment of the present invention, since each portion of the heat storage member 30 housed in each sleeve 31S has a circular cross section, manufacture and exchange of the portion of the heat storage member 30 are easy.

Because the gas flow hole 26 formed in the burner tile 22 is connected to the cylindrical sleeve 31S via the funnel-shaped portion 26A, no step is formed at the connection. Therefore, pressure loss is minimized and the directivity of the supply air when flowing out of the hole is kept strong.

Further, because an O-ring is eliminated from the sliding surfaces of the disks 44 and 46, seal reliability is enhanced.

Further, because the gas flow openings 42 and 43 and apertures 47 have semi-circular shapes, the opening areas can be large and a pressure loss when air and gas pass therethrough is small.

In the fourth embodiment of the present invention, as illustrated in FIGS. 12 and 13, the rotatable disk 44 of the switching mechanism 40 selectively takes a first position P1 and a second position P2 and is rotated in opposite directions from the first position to the second position and from the second position to the first position. The rotatable disk 44 is rotated by drive device 45 which is, for example, an air cylinder. Switching by the air cylinder is conducted in a short time period compared with rotation by an electric motor so that the switching mechanism effectively constitutes an instantaneous shutter.

The heat storage member 30 is divided into two sections by the dividing wall, including wall portions 31A and 31B in the circumferential direction. A thickness of the wall portion 31A which the supply air flow opening 42 passes is greater than a thickness of the wall portion 31B which the exhaust gas flow opening 45 passes. The thickness of the wall portion 31A is greater than a diameter of the supply air flow opening 42, and the thickness of the wall portion 31B is less than a diameter of the exhaust gas flow opening 43. Therefore, the exhaust gas flow opening 43 is not perfectly closed at all positions of rotation of the rotatable disk 44 (i.e., even when the gas flow opening 43 comes to an intermediate no-perforated portion of the stationary disk between the apertures 47), whereby burnt gas of a mixture of fuel and pilot air can be exhausted at any time.

When the supply air flow opening 42 comes to a non-perforated portion of the stationary disk between the apertures 47, the supply air flow opening 42 is closed. At that time, a fuel supply amount adjusting mechanism 6 (for example, a control valve) provided on a fuel supply line throttles the fuel flow so that a ratio of supply air to fuel is maintained constant and a continuous combustion by pilot fuel and pilot air is possible.

With respect to operation and advantages obtained in the fourth embodiment of the present invention, since either one of supply air and exhaust gas continuously flows through any section of the heat storage member 30, the heat storage member is most effectively utilized and so is minimized in size.

In the fifth embodiment of the present invention, as illustrated in FIGS. 14 and 15, the number of the gas flow openings 42 and 43 is at least four, thereby constituting a multi-opening shutter. The switching mechanism 40 includes the rotatable disk 44 drivable in opposite directions by an air cylinder 45, and the stationary disk 46. A plurality of circular apertures 47 are formed in the stationary disk 46, and a plurality of substantially rectangular openings 42 and 43 are formed in the rotatable disk 44. At least two supply air flow openings 42 are located outside the cylindrical partitioning wall 41 on each side of the dividing wall 31. At least two exhaust gas flow openings 43 are located inside the partitioning wall 41 on each side of the dividing wall 31.

An exhaust gas suctioning mechanism 49 for drawing exhaust gas by injecting a portion of supply air is provided in the exhaust gas passage. The rotatable disk 44 is pushed against the stationary disk 46 by a spring 51, whereby seal integrity is strengthened.

With respect to operation and advantages obtained in the fifth embodiment of the present invention, in FIG. 15, position a shows an air supply on a right side and gas exhaust on a left side, position b shows an example of idling, and position c shows an example of gas exhaust on a right side and air supply on a left side. The rotatable disk 44 is rotated through positions a, b, and c and is reversed through positions c, b, and a. In the idling state, the supply air flow openings 42 are perfectly closed, but at any time the exhaust gas flow openings 43 are at least partially open so that continuous exhaust is possible.

Because all portions of the heat storage member 30 are used, it is possible to make best use of the heat storage member 30, and therefore, to make the burner and the furnace compact. Further, due to the multi-opening structure, the flow through the heat storage member 30 is more uniform than in the fourth embodiment of the invention. The heat storage member 30 is therefore further effectively utilized.

In the sixth embodiment of the present invention, as illustrated in FIGS. 16 and 17, the pilot air pipe 21 and the fuel injection nozzle 20 are coupled to each other by an electrically insulating member 20b and are rotatable about a common axis thereof. The pilot air pipe 21 is coupled to the rotatable disk 44, and the assembly of the pilot air pipe 21 and the fuel injection nozzle 20 rotates with rotation of the rotatable disk 44. The pilot fuel outlet 20a is directed toward the gas flow hole 26 acting as a supply air flow hole at all positions of rotation of the fuel injection nozzle 20.

With respect to an advantage obtained in the sixth embodiment of the present invention, because rotation of the fuel injection nozzle 20 and rotation of the rotatable disk 44 coincide with each other in rotational angle, the pilot fuel outlet 20a injects pilot fuel necessarily toward the supply air flow hole, and so air is sufficiently supplied to the flame of the pilot fuel to stabilize the combustion.

In the seventh embodiment of the present invention, as illustrated in FIG. 18, a combustion assistance cylinder 60 having the shape of a straight cylinder is provided. The combustion assistance cylinder 60 extends coaxially with the protruding portion 24 from the air supply and gas exhaust surface 23 to a position the front end of the protruding portion 24 and surrounds the plurality of gas flow holes 26 from outside thereof. The combustion assistance cylinder 60 is made from metal and is fixed to the casing 10. Combustion gas flows out from a front end of the combustion assistance cylinder 60 and burnt gas flows in from the front end of the combustion assistance cylinder 60.

With respect to an advantage obtained in the seventh embodiment of the present invention, when the temperature of combustion gas is low, the temperature of the heat storage member 30 is also low so that supply air is not sufficiently warmed and expanded in volume. Thus, the speed of supply air when injected through the gas flow hole 26 is not high, and directivity of the supply air is not strong. The supply air flow is therefore likely to scatter. However, because the combustion assistance cylinder 60 is provided, scatter of supply air is suppressed to maintain air supply and to stabilize combustion. As a result, CO in the exhaust gas is further decreased to a level less than about 10 ppm and NOx in the exhaust gas is also decreased to a level less than about 30 ppm.

In the eighth embodiment of the present invention, as illustrated in FIG. 19, a combustion assistance cylinder 61 is provided. The combustion cylinder 61 extends coaxially with the protruding portion 24 from the air supply and gas exhaust surface 23 to a position ahead from the end of the protruding portion 24 and surrounds the plurality of gas flow holes 26 from outside thereof. The combustion assistance cylinder 61 has a front end throttled in cross section and a rear end where a plurality of burnt gas return holes 62 are formed. In a case where the guide grooves 27 are provided, the burnt gas return holes 62 are provided radially corresponding to the grooves 27 in position.

With respect to an advantage obtained in the eighth embodiment of the present invention, scatter of supply air is prevented. In this instance, since the front end of the cylinder 61 is throttled, scatter of supply air is more effectively prevented. As a result, lack of air is unlikely to occur and the combustion is stable. CO in the exhaust gas is further decreased (less than 10 ppm). Further, since the front end of the cylinder 61 is throttled, an amount of exhaust gas entering the cylinder 61 through the front end of the cylinder 61 is small. Exhaust gas can enter through the exhaust gas return hole 62, however, so that pressure loss is not increased. Since the amount of exhaust gas entering the cylinder 61 through the exhaust gas return hole 62 is large, the combustion is slacked and NOx is not increased.

In the ninth embodiment of the present invention, as illustrated in FIG. 20, the burner tile 22 has an air nozzle separator 29 which protrudes ahead from the air supply and gas exhaust surface 23 and extends in a radial direction of the burner tile 22 between adjacent two gas flow holes 26. Further, a combustion assistance cylinder 63 is provided. The combustion assistance cylinder 63 extends coaxially with the protruding portion 24 from the front end of the air nozzle separator 29 to a position ahead the front end of the protruding portion 24. Cylinder 63 surrounds the protruding portion 24 having the guide grooves 27 from outside of the protruding portion 24. The combustion assistance cylinder 63 is shorter than cylinder 60 of the seventh embodiment of the present invention. The combustion assistance cylinder 63 is constructed of the same material as of the burner tile 22 (for example, ceramic). A rear end of the combustion assistance cylinder 63 is distanced from the air supply and gas exhaust surface 23 by an axial thickness (height) of the air nozzle separator 29.

With respect to an advantage obtained in the ninth embodiment, because combustion assistance cylinder 63 is provided, scatter of supply air is suppressed. As a result, lack of air during combustion is unlikely to occur. Combustion is stabilized and accompanied by a decrease in the amount of CO generated. The gap between the rear end of the combustion assistance cylinder 63 and the air supply and gas exhaust surface 23 functions as a gap for returning burnt gas into the cylinder 63, like the exhaust gas returning hole 62 of the eighth embodiment of the present invention.

In the tenth embodiment of the present invention, as illustrated in FIGS. 21 and 22, an inside surface of a downstream end of each of the gas flow holes 26 is distanced from an outside surface of the protruding portion by distance A in a radial direction of the burner tile 22. The air nozzle separator 29 extends radially outwardly from the outside surface of the protruding portion 24. The air nozzle separator 29 separates a supply air flow and an exhaust gas flow from each other in the vicinity of the gas flow holes 26.

With respect to operation and an advantage obtained in the tenth embodiment of the present invention, since distance A is provided, the supply air flowing out of the gas flow hole 26 is unlikely to be scattered in a direction away from the side surface of the protruding portion 24. This is because air in the space A is suctioned by the supply air flow and supply of air to the space A from the environment is not perfectly free, a relatively small negative pressure is generated in the space A, and the supply air flow is perpendicularly pressed toward the space A from the environment side. Due to this suppression of supply air flow scatter, a particular combustion assistance cylinder such as the cylinders 60 and 61 of the seventh and eighth embodiments of the present invention does not need to be provided. Further, the flame extends further deeply in the furnace.

In the eleventh embodiment of the present invention, as illustrated in FIG. 23, each of gas flow holes 26 has a first, downstream portion 26D and a second, upstream portion 26U connected to the first portion 26D. The first portion 26D is inclined from an axis of the protruding portion 24 at a first angle $\theta_D$ (an angle in a range of from 2 to 10 degrees), in a direction so that a downstream side extension of an axis of the first portion 26D approaches a downstream side extension of the axis of the protruding portion 24. A portion of an inside surface of the second portion 26U close to an axis of the burner tile 22 is inclined from the axis of the protruding portion 24 at a second angle $\theta_U$ greater than the first angle $\theta_D$, in a direction opposite to the direction of inclination of the axis of the first portion 26D.

With respect to operation and an advantage obtained in the eleventh embodiment of the present invention, due to the inclination of the first portion 26D, a direction of the supply air flow is inclined so as to collide with the fuel flow, so that scatter of supply air flow is suppressed. As a result, a combustion assistance cylinder such as the cylinders 60 and 61 of the seventh and eighth embodiments of the present invention does not need to be provided.

Further, at low temperatures, the supply air flow collides with the fuel flow. As a result, fuel and supply air are well mixed, so that flame and combustion are stabilized. At high temperatures, since the amount of heat transmitted from the heat storage member 30 to supply air is large, the volume of supply air is increased and the speed of supply air is high. Under such a high speed condition, operation of the second portion 26U to direct the supply air flow inwardly acts strongly and compensates for operation of the first portion 26D to direct the supply air inwardly. As a result, the supply air flows substantially parallel to the fuel flow. Also, mixture of fuel and supply air is not promoted, thereby suppressing generation of NOx.

In the twelfth embodiment of the present invention, as illustrated in FIGS. 24–26, each of the gas flow holes 26 formed in the burner tile 22 has the shape of a solid cylinder cut by an obliquely extending plane 26F. The plane 26F is located at a portion of each gas flow hole 26 far from the axis of the burner tile 22 and is inclined in a direction so that a downstream side extension of the plane 26F approaches a downstream side extension of the axis of the protruding portion 24.

With respect to operation and an advantage obtained in the twelfth embodiment of the present invention, since the oblique plane 26F is provided, the supply air flow is directed inwardly so that scatter of supply air flow is suppressed. A combustion assistance cylinder such as the cylinders 60 and 61 of the seventh and eighth embodiments of the present invention does not need to be provided.

Further, at low temperatures, since the supply air flow is directed obliquely inwardly by the oblique plane 26F, the supply air flow collides with the fuel flow so that fuel and supply air are well mixed to stabilize flame and combustion. At high temperatures, since a speed of supply air flow is increased because of an increase in volume of the supply air due to an increase in temperature, scatter components S of supply air due to the oblique plane 26F are increased as shown in FIG. 26. Therefore, lean combustion is possible to decrease the amount of NOx generated.

In the thirteenth embodiment of the present invention, as illustrated in FIGS. 27–29, a subsidiary air flow hole 26S is formed in the burner tile 22. The subsidiary air flow hole 26S has a first end opening at the front end of the protruding portion 24 and a second, opposite end opening at an inside surface of each of the gas flow holes 26 so that a portion of supply air flowing in the each gas flow hole 26 is introduced through the subsidiary air flow hole 26S to a portion ahead the front end of the protruding portion 24. The number of the subsidiary air flow hole 26S needed is variable. A downstream side extension of a tangential portion of the inner surface of the gas flow hole 26 (located upstream of the second end of the subsidiary air flow hole 26S) is located more inwardly in a radial direction of the gas flow hole 26 than a portion of the inner surface of the gas flow hole 26 located downstream of the second end of the subsidiary air flow hole 26S.

With respect to operation and an advantage obtained in the thirteenth embodiment of the present invention, although a furnace interior portion ahead of a burner tile portion between the gas flow hole 26 and the fuel release surface lacks sufficient combustion air, in this embodiment flame and combustion are stabilized because a portion of supply air is lead to that deficient portion. More particularly, as illustrated in FIG. 29, a pilot flame zone P is formed of ahead a front end of the fuel injection nozzle, and a main flame zone M is formed at a zone where main fuel and the supply air from the gas flow hole 26 mix with each other. Since a portion of the supply air through the subsidiary air flow hole 26S is supplied to a furnace interior portion between the main flame zone M and the pilot flame zone P, continuity between a main flame and a pilot flame is improved and the flames are stabilized.

Further, since the speed of the supply air flow is low at low temperatures, static pressure at the second, upstream end of the subsidiary air flow hole 26S is high. Therefore, a relatively large amount of supply air is introduced through the subsidiary air flow hole 26S and the above stabilization of flame is strongly obtained. At high temperatures, since the speed of the supply air is high, the static pressure at the second, upstream end of the subsidiary air flow hole 26S is low, so that the amount of supply air flowing through the subsidiary air flow hole 26S is decreased and NOx generation is suppressed.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An industrial furnace comprising:
   a heat storage member having an axis and comprising a plurality of independent sections which are separated from each other along a circumferential direction of said heat storage member;
   a burner tile provided on one side of said heat storage member, said burner tile including a fuel injection nozzle insertion hole, and an air supply and gas exhaust surface including a plurality of gas flow holes constructed and arranged to selectively permit supply air and exhaust gas to pass therethrough; and
   a switching mechanism disposed on a side of said heat storage member opposite from said burner tile, said switching mechanism including a stationary disk, a rotatable disk slidably contacting said stationary disk, and a partitioning wall separating a supply air flow area and an exhaust gas flow area, wherein said stationary disk includes a plurality of apertures, said rotatable disk including a plurality of openings for gas flow which are openable and closable in accordance with rotation of said rotatable disk, said plurality of openings including at least one supply air flow opening communicating with said supply air flow area located on one side of said partitioning wall and at least one exhaust gas flow opening communicating with said exhaust gas flow area located on a side of said partitioning wall opposite said supply air flow area, and wherein said heat storage member, said burner tile, and said switching mechanism are independent from each other.

2. An industrial furnace according to claim 1, wherein shapes and positions of said plurality of openings formed in said rotatable disk and shapes and positions of said plurality of apertures formed in said stationary disk are related to each other such that a total cross-sectional area of at least one gas flow hole formed in said burner tile and a respective opposing exhaust gas flow opening formed in said rotatable disk is equal to or greater than a total cross-sectional area of at least one gas flow hole formed in said burner tile and a respective opposing supply air flow opening formed in the rotatable disk.

3. An industrial furnace according to claim 1, wherein shapes and positions of said plurality of openings formed in said rotatable disk and shapes and positions of said plurality of apertures formed in said stationary disk are related to each other such that a total volume of at least one section of the heat storage member covered by an exhaust gas flow opening formed in the rotatable disk is equal to or greater than a total volume of at least one section of the heat storage member covered by a supply air flow opening formed in the rotatable disk.

4. An industrial furnace according to claim 1, further comprising:
   an air supply blower for supplying air communicated with said supply air flow area in said switching mechanism.

5. An industrial furnace according to claim 1, further comprising:

an exhaust gas suctioning fan communicated with said exhaust gas flow area in said switching mechanism.

6. An industrial furnace according to claim 1, further comprising:

an air supply blower connected to said supply air flow area in said switching mechanism; and an exhaust gas suctioning fan connected to said exhaust gas flow area in said switching mechanism.

7. An industrial furnace according to claim 1, further comprising:

an air supply blower connected to the supply air flow area in said switching mechanism; and an exhaust gas suctioning fan connected to said exhaust gas flow area in said switching mechanism, and wherein said blower and said fan are driven by a common driving device.

8. An industrial furnace according to claim 1, said heat storage member is further divided into a plurality of portions along an axial direction of said heat storage member, wherein a gap is provided between adjacent portions of the heat storage member so as to generate a turbulent flow.

9. An industrial furnace according to claim 1, further comprising:

a dividing wall constructed and arranged to partition said sections of said heat storage member from each other along said circumferential direction of said heat storage member, said dividing wall extending in a radial direction relative to said heat storage member, while said partitioning wall of the switching mechanism extends in a circumferential direction relative to switching mechanism.

10. An industrial furnace according to claim 1, wherein said rotatable disk is rotatable in only one direction.

11. An industrial furnace according to claim 1, further comprising an electric motor for rotatably driving said rotatable disk, said rotatable disk being rotatable by said motor in only one direction.

12. An industrial furnace according to claim 1, further comprising an electric motor for driving a rotatable portion of said switching mechanism, said motor being disposed on a side of said partitioning wall corresponding to said at least one supply air flow opening formed in the rotatable disk is located.

13. An industrial furnace according to claim 1, wherein said rotatable disk is three dimensional, wherein a side of said at least one supply air flow opening formed in said rotatable disk adjacent to said stationary disk and a side of said at least one exhaust gas flow opening formed in said rotatable disk adjacent to said stationary disk are located on a common circle, wherein said plurality of apertures formed in said stationary disk are located on a common circle.

14. An industrial furnace according to claim 1, wherein said rotatable disk is three dimensional, and a side of said at least one supply air flow opening formed in said rotatable disk adjacent to said stationary disk and a side of said at least one exhaust gas flow opening formed in said rotatable disk adjacent to said stationary disk are located on a common circle, wherein one of a supply air passage communicating with said at least one supply air flow opening on an upstream side of said at least one supply air flow opening and an exhaust gas passage communicating with said at least one exhaust gas flow opening on a downstream side of said at least one exhaust gas flow opening is connected to said switching mechanism in an axial direction of said switching mechanism and the other of said supply air passage and said exhaust gas passage is connected to said switching mechanism in a direction perpendicular to the axial direction of the switching mechanism.

15. An industrial furnace according to claim 1, further comprising:

an exhaust gas suctioning mechanism disposed downstream of said at least one exhaust gas flow opening in an exhaust gas flow direction, said exhaust gas suctioning mechanism jetting out a portion of supply air.

16. An industrial furnace according to claim 1, wherein each said section of said heat storage member is inserted in a corresponding sleeve member.

17. An industrial furnace according to claim 1, wherein each said section of said storage member is inserted in a corresponding sleeve having an inside surface, wherein each of said gas flow holes formed in the burner tile includes a funnel-shaped portion which is enlarged in cross section in a direction toward an upstream of a flow direction of supply air, whereby a surface of each said gas flow hole is smoothly connected to said inside surface of each cylindrical sleeve via a surface of each funnel-shaped portion.

18. An industrial furnace according to claim 1, wherein said rotatable disk and said stationary disk contact each other to form seal therebetween, and wherein said rotatable disk is biased against the stationary disk by a spring.

19. An industrial furnace according to claim 1, wherein said plurality of openings for gas flow formed in said rotatable disk have a substantially semi-circular shape, and said apertures formed in said stationary disk have a substantially semi-circular shape.

20. An industrial furnace according to claim 1, wherein said rotatable disk comprises a disk rotatable in opposite directions.

21. An industrial furnace according to claim 1, further comprising an air cylinder constructed and arranged to rotate said rotatable disk in opposite directions.

22. An industrial furnace according to claim 1, wherein said rotatable disk is selectively rotatable in opposite directions between first and second rotational positions.

23. An industrial furnace according to claim 1, further comprising:

a fuel supply adjusting mechanism for throttling a fuel flow when said at least one supply air flow opening formed in said rotatable disk opposes a solid portion of said stationary disk between said apertures.

24. An industrial furnace according to claim 1, wherein shapes and positions of said openings for gas flow formed in said rotatable disk and shapes and positions of said apertures formed in said stationary disk are related to each other so that said at least one exhaust gas flow opening remains not completely closed by a solid portion of said stationary disk between said apertures at all rotational positions of said rotatable disk.

25. An industrial furnace according to claim 1, wherein said switching mechanism comprises a multi-opening shutter having at least five openings.

26. An industrial furnace according to claim 1, wherein the industrial furnace is a kind of furnace selected from the group composed of a melting furnace, a sintering furnace, a preheating furnace, a soaking pit, a forging furnace, a heating furnace, an annealing furnace, a solution annealing furnace, a plating furnace, a drying furnace, a heat treatment furnace, a heating furnace for quenching, a tempering furnace, an oxidizing and reducing furnace, a kiln, a baking furnace, a roasting furnace, a molten metal holding furnace, a fore hearth, a crucible furnace, a homogenizing furnace, an aging furnace, a reaction promoting furnace, a distilling furnace, a ladle dry preheating furnace, a mold preheating furnace, a normalizing furnace, a brazing furnace, a carburizing furnace, an oven for drying paint, a holding furnace, a nitriding furnace, a salt bath furnace, a glass melting furnace, boilers including a boiler for electric power generation, incinerators including an incinerator for burning garbage, and a hot water supply apparatus.

27. An industrial furnace comprising:
a burner tile including:
an air supply and gas exhaust surface including a plurality of gas flow holes constructed and arranged to selectively permit supply air and exhaust gas pass therethrough;
a protruding portion extending away from said air supply and gas exhaust surface and having an interior surface; and
a fuel release surface for releasing injected fuel, the fuel release surface being formed on said interior surface and extending to a front end of said protruding portion opposite said air supply and gas exhaust surface.

28. An industrial furnace according to claim 27, wherein said fuel release surface is formed so as to be spread in a direction toward said front end of said protruding portion.

29. An industrial furnace according to claim 27, wherein a plurality of guide grooves are formed in a radially outer portion of said protruding portion so as to extend in an axial direction and to coincide with at least some of said gas flow holes formed in the burner tile.

30. An industrial furnace according to claim 29, wherein said burner tile further includes an air nozzle separator protruding from said air supply and gas exhaust surface and extending in a radial direction between adjacent gas flow holes thereon, and further comprising:
a combustion assistance cylinder extending coaxially with said protruding portion from a front end of said air nozzle separator to a position ahead of said front end of said protruding portion and surrounding the protruding portion.

31. An industrial furnace according to claim 27, wherein the burner tile further includes an air nozzle separator protruding away from the air supply and gas exhaust surface between adjacent gas flow holes formed therein.

32. An industrial furnace according to claim 27, wherein said gas flow holes are throttled in cross section in a supply air flow direction except for end portions of respective said gas flow holes.

33. An industrial furnace according to claim 27, further comprising:
a pilot air supply pipe communicating with said fuel release surface;
a fuel injection nozzle disposed within said pilot air supply pipe; and
a switching mechanism constructed and arranged to selectively gas flow between air supply and gas exhaust, and wherein said pilot air supply pipe and said fuel injection nozzle are synchronously rotatable about a common axis thereof.

34. An industrial furnace according to claim 27, further comprising:
a combustion assistance cylinder extending coaxially with said protruding portion at a periphery of said air supply and gas exhaust surface to a position ahead of said front end of said protruding portion, thereby surrounding said plurality of gas flow holes.

35. An industrial furnace according to claim 27, further comprising:
a combustion assistance cylinder extending coaxially with said protruding portion at a periphery of said air supply and gas exhaust surface to a position ahead of said front end of said protruding portion, thereby surrounding said plurality of gas flow holes, said combustion assistance cylinder having a front end throttled in cross section and a rear end provided with a plurality of burnt gas return holes.

36. An industrial furnace according to claim 27, wherein an inside surface of a downstream end of each gas flow hole is spaced from an outside surface of said protruding portion in a radial direction.

37. An industrial furnace according to claim 27, wherein each gas flow hole has a first, downstream portion and a second, upstream portion connected to the first portion, said first portion being inclined from an axis of the protruding portion at a first angle in a direction intersecting an axis of said protruding portion, wherein a portion of an inside surface of said second portion close to an axis of said burner tile is inclined from said axis of said protruding portion at a second angle greater than said first angle, in a direction opposite to said direction of inclination of said first portion.

38. An industrial furnace according to claim 27, wherein each gas flow hole has the shape of a cylinder cut by an obliquely extending plane, said plane being located at a portion of each gas flow hole distal to an axis of said burner tile and being inclined in a direction approaching an axis of said protruding portion.

39. An industrial furnace according to claim 27, wherein a subsidiary air flow hole is formed in the burner tile, said subsidiary air flow hole having a first end opening at said front end of said protruding portion, and a second, opposite end opening at an inside surface of each gas flow hole so as to introduce a portion of supply air in said each gas flow hole to a portion ahead said front end of said protruding portion.

40. An industrial furnace according to claim 27, wherein the industrial furnace is a kind of furnace selected from the group composed of a melting furnace, a sintering furnace, a preheating furnace, a soaking pit, a forging furnace, a heating furnace, an annealing furnace, a solution annealing furnace, a plating furnace, a drying furnace, a heat treatment furnace, a heating furnace for quenching, a tempering furnace, an oxidizing and reducing furnace, a kiln, a baking furnace, a roasting furnace, a molten metal holding furnace, a fore hearth, a crucible furnace, a homogenizing furnace, an aging furnace, a reaction promoting furnace, a distilling furnace, a ladle dry preheating furnace, a mold preheating furnace, a normalizing furnace, a brazing furnace, a carburizing furnace, an oven for drying paint, a holding furnace, a nitriding furnace, a salt bath furnace, a glass melting furnace, boilers including a boiler for electric power generation, incinerators including an incinerator for burning garbage, and a hot water supply apparatus.

41. A burner comprising:
a heat storage member including a plurality of independent circumferential sections;
a burner tile disposed on one side of said heat storage member, said burner tile including a fuel injection nozzle insertion hole, an air supply and gas exhaust surface including a plurality of gas flow holes constructed and arranged to selectively permit supply air and exhaust gas to pass therethrough; and
a switching mechanism disposed on the other side of said heat storage member from said burner tile, said switching mechanism including a stationary disk, a rotatable disk slidably contacting said stationary disk, and a partitioning wall defining a supply air flow area and an exhaust gas flow area, said stationary disk including a plurality of apertures, said rotatable disk including a plurality of openings for gas flow which are openable and closable in accordance with rotation of said rotatable disk, said openings including at least one supply air flow opening communicating with said supply air flow area located on one side of said partitioning wall and at least one exhaust gas flow opening communicating with said exhaust gas flow area located on the other side of said partitioning wall.

42. A burner according to claim 41, wherein shapes and positions of said openings and shapes and positions of said apertures related to each other such that a total cross-sectional area of at least one gas flow hole formed in said burner tile and one said exhaust gas flow opening formed in said rotatable disk is equal to or greater than a total cross-sectional area of at least one gas flow hole formed in the burner tile and one said supply air flow opening formed in said rotatable disk.

43. A burner according to claim 41, wherein shapes and positions of said openings formed in said rotatable disk and shapes and positions of said apertures formed in said stationary disk are related to each other such that a total volume of at least one section of said heat storage member and said exhaust gas flow opening formed in said rotatable disk is equal to or greater than a total volume of at least one section of said heat storage member and said supply air flow opening formed in the rotatable disk.

44. A burner according to claim 41, further comprising:
a blower for supplying air is directly connected to said supply air flow area in said switching mechanism communicating with said supply air flow opening formed in said rotatable disk.

45. A burner according to claim 41, further comprising:
a fan for suctioning exhaust gas connected to said exhaust gas flow area in said switching mechanism communicating with said exhaust gas flow opening formed in said rotatable disk.

46. A burner according to claim 41, further comprising:
a blower for supplying air connected to said supply air flow area in said switching mechanism communicating with said supply air flow opening formed in said rotatable disk; and
a fan for suctioning exhaust gas connected to said exhaust gas flow area in said switching mechanism communicating with said exhaust gas flow opening formed in said rotatable disk.

47. A burner according to claim 41, further comprising:
a blower for supplying air connected to said supply air flow area in said switching mechanism communicating with said supply air flow opening formed in said rotatable disk; and
a fan for suctioning exhaust gas connected to said exhaust gas flow area in said switching mechanism communicating with said exhaust gas flow opening formed in said rotatable disk, and wherein said blower for supplying air and said fan for suctioning exhaust gas are driven by a common drive device.

48. A burner according to claim 41, wherein said heat storage member is further divided into a plurality of portions along an axial direction of said heat storage member, a gap in which a turbulent flow is generated being provided between adjacent portions of said heat storage member.

49. A burner according to claim 41, further comprising:
a dividing wall for partitioning said sections of said heat storage member from each other, said dividing wall extending in a radial direction of the heat storage member, while the partitioning wall of said switching mechanism extends in a circumferential direction.

50. A burner according to claim 41, wherein said rotatable disk is rotatable in only one direction.

51. A burner according to claim 41, further comprising an electric motor constructed and arranged to rotate said rotatable disk in only one direction.

52. A burner according to claim 41, further comprising an electric motor constructed and arranged to rotate a rotatable portion of said switching mechanism, said electric motor being disposed on a side of said partitioning wall corresponding to the location of said supply air flow opening formed in said rotatable disk.

53. A burner according to claim 41, wherein said rotatable disk is three dimensional, and wherein a side of said supply air flow opening opposite said stationary disk and a side of said exhaust gas flow opening formed in said rotatable disk close to said stationary disk are located on a common circle, wherein said apertures formed in said stationary disk are located on a common circle.

54. A burner according to claim 41, wherein said rotatable disk is three dimensional, and an end portion of said supply air flow opening formed in said rotatable disk adjacent to said stationary disk and an end portion of said exhaust gas flow opening formed in said rotatable disk close to the stationary disk are located on a common circle, wherein one of a supply air passage communicating with said supply air flow opening from an upstream side of the supply air flow opening and an exhaust gas passage communicating with said exhaust gas flow opening from a downstream side of the exhaust gas flow opening is connected to said switching mechanism in an axial direction of the switching mechanism, and the other of said supply air passage and said exhaust gas passage is connected to said switching mechanism in a direction perpendicular to the axial direction of said switching mechanism.

55. A burner according to claim 41, further comprising:
an exhaust gas suctioning mechanism disposed downstream of the exhaust gas flow opening relative to an exhaust gas flow direction and jetting out a portion of supply air.

56. A burner according to claim 41, wherein each section of said heat storage member is inserted in a corresponding sleeve.

57. A burner according to claim 41, wherein each section of said storage member is inserted in a corresponding sleeve, wherein each gas flow hole formed in said burner tile includes a funnel-shaped portion which diverges in cross section in an upstream direction relative to a flow direction of supply air, so that a surface of each gas flow hole is connected smoothly to an inside surface of each cylindrical sleeve via a surface of each respective funnel-shaped portion of each gas flow hole.

58. A burner according to claim 41, wherein the rotatable disk and the stationary disk contact each other to form a seal therebetween, wherein said rotatable disk is urged toward said stationary disk by a spring.

59. A burner according to claim 41, wherein said gas flow openings formed in said rotatable disk are substantially semi-circular in shape, and wherein said apertures formed in said stationary disk are substantially semi-circular in shape.

60. A burner according to claim 41, wherein said rotatable disk is rotatable in opposite directions.

61. A burner according to claim 41, further comprising means for rotating said rotatable disk in opposite directions, the means comprising an air cylinder.

62. A burner according to claim 41, wherein said rotatable disk selectively rotates in opposite directions between first and second rotational positions.

63. A burner according to claim 41, further comprising:
a fuel supply amount adjusting mechanism constructed and arranged to throttle a fuel flow when said supply air flow openings formed in said rotatable disk opposes a non-perforated portion of said stationary disk between said apertures.

64. A burner according to claim 41, wherein shapes and positions of said openings for gas flow formed in said rotatable disk and shapes and positions of said apertures formed in said stationary disk are related to each other so that said at least one exhaust gas flow opening always at most partially closed at all rotational positions of said rotatable disk by a non-perforated portion of said stationary disk between said apertures.

65. A burner according to claim 41, wherein said switching mechanism comprises a multi-opening shutter having at least five openings for gas flow.

66. A burner comprising:
a burner tile including:
an air supply and gas exhaust surface including a plurality of gas flow holes constructed and arranged to selectively permit supply air and exhaust gas to pass therethrough;
a protruding portion having an interior surface extending away from said air supply and gas exhaust surface; and
a fuel release surface for releasing injected fuel and formed on said interior surface of and extending to an end of said protruding portion distal to said air supply and gas exhaust surface.

67. A burner according to claim 66, wherein the fuel release surface is spread in a direction toward said front end of said protruding portion.

68. A burner according to claim 66, wherein a plurality of guide grooves are formed in a radially outer portion of the protruding portion and extend in an axial direction of the protruding portion so as to coincide in position with the gas flow holes formed in the burner tile.

69. A burner according to claim 68, wherein the burner tile further includes an air nozzle separator protruding from said air supply and gas exhaust surface and extending in a radial direction between adjacent gas flow holes;
said burner further comprising:
a combustion assistance cylinder extending coaxially relative to said protruding portion from a front end of said air nozzle separator to a position beyond said front end of said protruding portion and surrounding a portion of said protruding portion having said guide grooves thereon.

70. A burner according to claim 66, wherein the burner tile further includes an air nozzle separator protruding away from said air supply and gas exhaust surface and extending in a radial direction between adjacent gas flow holes.

71. A burner according to claim 66, wherein said gas flow holes are each throttled in cross section toward said air supply and gas exhaust surface along a supply air flow direction except for end portions of said gas flow holes close to said air supply and gas exhaust surface.

72. A burner according to claim 66, further comprising:
a pilot air supply pipe communicating with a space inside said fuel release surface;
a fuel injection nozzle disposed within said pilot air supply pipe; and
a switching mechanism operable in accordance with rotation of a rotatable disk, and
wherein said pilot air supply pipe and said fuel injection nozzle are rotatable about a common axis thereof, and rotation of said pilot air supply pipe and said fuel injection nozzle and rotation of said rotatable disk are synchronously performed.

73. A burner according to claim 66, further comprising:
a combustion assistance cylinder extending from a periphery of said air supply and gas exhaust surface coaxially relative to said the protruding portion to a position beyond said front end of said protruding portion and surrounding said plurality of gas flow holes at a periphery thereof.

74. A burner according to claim 66, further comprising:
a combustion assistance cylinder extending from said air supply and gas exhaust surface beyond said front end of said protruding portion, said combustion assistance cylinder surrounding said plurality of gas flow holes at a periphery thereof, said combustion assistance cylinder having a front end throttled in cross section and a rear end provided with a plurality of burnt gas return holes.

75. A burner according to claim 66, wherein an inside surface of a downstream end of each said gas flow hole is spaced from an outside surface of said protruding portion in a radial direction.

76. A burner according to claim 66, wherein each gas flow hole has a first, downstream portion and a second, upstream portion connected to the first portion, said first portion being inclined from an axis of said protruding portion at a first angle in a direction approaching an axis of said protruding portion, a portion of an inside surface of said second portion close to an axis of said burner tile being inclined from said axis of the protruding portion at a second angle greater than said first angle in a direction opposite to said direction of inclination of said axis of said first portion.

77. A burner according to claim 66, wherein each gas flow hole has the shape of a cylinder cut by an obliquely extending plane, the plane being inclined in a direction such that a downstream side extension of said plane approaches a downstream side extension of an axis of said protruding portion.

78. A burner according to claim 66, wherein a subsidiary air flow hole is formed in said burner tile, said subsidiary air flow hole having a first end opening at the front end of said protruding portion and a second, opposite end opening at an inside surface of each gas flow hole so as to introduce a portion of supply air flowing in each gas flow hole to a portion ahead of said protruding portion.

79. In a furnace including a burner tile having an air supply and gas exhaust surface and a plurality of gas flow holes formed therethrough, the plurality of gas flow holes being constructed and arranged to selectively permit either a supply air or an exhaust gas to pass therethrough, the furnace further including a protrusion portion having an interior surface and extending away from the air supply and gas exhaust surface, and a fuel release portion provided on the interior surface of the protrusion portion, a combustion recirculation method comprising the steps of:
supplying the supply air into the furnace through at least one of the plurality of gas flow holes selectively acting as a supply air flow hole;
directing the supply air so as to draw and entrain a portion of burnt gas derived from operation of the furnace, the supply air flowing along an interior surface of the protruding portion in a direction away from the air supply and gas exhaust surface, thereby recirculating burnt gas in the furnace; and mixing additional supply air and the recirculated portion of burnt gas with fuel released from the fuel release portion, flowing the mixture of additional supply air, recirculated burnt gas, and fuel away from the protruding portion and the air supply and gas exhaust surface.

80. A combustion recirculation method according to claim 79, further comprising the step of:

exhausting burnt gas from the furnace through at least one of the plurality of gas flow holes selectively acting as an exhaust gas flow hole, wherein a front end of the fuel release portion is spaced from the air supply and gas exhaust surface by a length of the protrusion portion.

* * * * *